United States Patent
Wald et al.

(10) Patent No.: US 11,520,461 B2
(45) Date of Patent: Dec. 6, 2022

(54) DOCUMENT CONTRIBUTION MANAGEMENT SYSTEM

(71) Applicant: MICROSOFT TECHNOLOGY LICENSING, LLC, Redmond, WA (US)

(72) Inventors: Andrew James Wald, Bothell, WA (US); Jill Kathleen Larson, Bellevue, WA (US); Rui Hu, Redmond, WA (US); Venkat Pradeep Chilakamarri, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 16/180,428

(22) Filed: Nov. 5, 2018

(65) Prior Publication Data
US 2020/0142545 A1 May 7, 2020

(51) Int. Cl.
*G06F 3/0482* (2013.01)
*G06N 99/00* (2019.01)
*G06N 20/00* (2019.01)
*H04L 67/141* (2022.01)

(52) U.S. Cl.
CPC ........... *G06F 3/0482* (2013.01); *G06N 20/00* (2019.01); *H04L 67/141* (2013.01)

(58) Field of Classification Search
CPC .. G06Q 10/101; H04N 7/155; H04L 12/1822; H04L 67/141; G06F 3/0482; G06N 20/00
See application file for complete search history.

(56) References Cited

U.S. PATENT DOCUMENTS

| | | |
|---|---|---|
| 8,458,196 B1 | 6/2013 | Procopio |
| 8,645,396 B2 | 2/2014 | McNally et al. |
| 9,594,756 B2 | 3/2017 | Sabharwal |

(Continued)

OTHER PUBLICATIONS

Estes, et al., "Metric-Based Content Ending System" as application as filed in U.S. Appl. No. 16/013,554, Filed Date: Jun. 20, 2018, 31 Pages.

(Continued)

*Primary Examiner* — Jennifer N Welch
*Assistant Examiner* — Parmanand D Patel
(74) *Attorney, Agent, or Firm* — NovoTechIP International PLLC

(57) ABSTRACT

A contribution management system and process for facilitating the identification of individual users who have made contributions to an electronic content item, and the extent of that contribution. As an example, a reader may review the list of contributors with a representation of their relative degree or amount of contribution to the document, and also allow for access to other documents that have been developed by the identified contributor. These tools can provide collaborative document users the ability to more clearly distinguish casual contributors or non-contributing owners of the document from higher-level contributors whose authorship has significantly shaped the content. In addition, the listing or identification of top contributors can be configured to facilitate communication between an interested reader and the identified contributor, which increases the ease with which members of larger organizations can collaborate, seek mentorship, or develop useful relationships.

17 Claims, 13 Drawing Sheets

(56) References Cited

U.S. PATENT DOCUMENTS

| | | | |
|---|---|---|---|
| 2003/0135606 A1* | 7/2003 | Goodwin | G06Q 50/01 709/224 |
| 2006/0136511 A1 | 6/2006 | Ngo et al. | |
| 2009/0217196 A1* | 8/2009 | Neff | G06F 3/0482 715/799 |
| 2010/0005099 A1 | 1/2010 | Goodman et al. | |
| 2010/0174997 A1 | 7/2010 | O'sullivan et al. | |
| 2013/0024873 A1* | 1/2013 | Hillier | G06F 9/54 719/313 |
| 2014/0337279 A1* | 11/2014 | Mo | G06Q 10/103 707/608 |
| 2015/0052427 A1* | 2/2015 | Vagell | G06F 17/24 715/256 |
| 2015/0378997 A1 | 12/2015 | Becker et al. | |
| 2015/0379887 A1* | 12/2015 | Becker | G09B 17/003 715/229 |
| 2016/0107089 A1* | 4/2016 | Jackson | A63F 13/814 463/35 |
| 2016/0224939 A1* | 8/2016 | Chen | G06Q 10/107 |
| 2016/0314122 A1 | 10/2016 | Platakis et al. | |
| 2017/0193420 A1* | 7/2017 | Tiwari | G06Q 10/06398 |
| 2017/0359331 A1* | 12/2017 | Bonnet | H04L 63/083 |
| 2018/0115603 A1 | 4/2018 | Hu et al. | |
| 2018/0329616 A1* | 11/2018 | Truelove | G06F 3/04847 |
| 2019/0179494 A1* | 6/2019 | Colagrosso | G06N 20/00 |

OTHER PUBLICATIONS

"International Search Report and Written Opinion Issued in PCT Application No. PCT/US19/058423", dated Dec. 18, 2019, 12 Pages.

* cited by examiner

| TOP CONTRIBUTORS  ALL PEOPLE (12) | | |
|---|---|---|
| | LAST MODIFIED | |
| KAT LARSSON<br>PUBLICIST | TODAY | 52% CONTRIBUTED |
| CARLA SANCHEZ (YOU)<br>MARKETER | TODAY | 25% CO ✎ 14% NEW CONTENT ADDED<br>🕐 1.5H SPENT TYPING |
| BRIANA IWAMOTO<br>MARKETER | 2 DAYS AGO | 17% CONTRIBUTED |
| KIM LETTERMAN<br>PUBLICIST | TODAY | 2% CONTRIBUTED |
| CARL TRENTON<br>MARKETER | 3 WEEKS AGO | 1% CONTRIBUTED |
| BRIAN MILLS<br>MARKETER | 1 MONTH AGO | 1% CONTRIBUTED |
| JIM ROGERS<br>PUBLICIST | 5 DAYS AGO | .6% CONTRIBUTED |
| LANA LIVINGSTON<br>MARKETER | YESTERDAY | .4% CONTRIBUTED |

620 {
- BRIANA IWAMOTO  
  MARKETER  
  OXO GROWTH  } 622
- SEND EMAIL   📞 624

630 {
- COLLABORATIONS WITH BRIANA >
- FY2017 TREND ANALYSIS
- MARKETING TRENDS
- INTERNATIONAL ADS

640 {
- UNREAD DOCUMENTS FROM BRIANA >
- WHO'S WHO IN TRADE

650

TOP CONTRIBUTORS ⓘ

| NAME | LAST MODIFIED | |
|---|---|---|
| KAT LARSSON PUBLICIST | TODAY | 52% CONTRIBUTED |
| CARLA SANCHEZ (YOU) MARKETER | TODAY | 25% CONTRIBUTED |
| BRIANA IWAMOTO MARKETER — 642 | 2 DAYS AGO | 17% CONTRIBUTED |

690

SHOW MORE

DOCUMENT CONTRIBUTION MANAGEMENT SYSTEM

BACKGROUND

Collaborative authoring and review processes are often used in the development and preparation of different types of documents. For example, many documents generated in today's electronic society are created by one or more individuals, and then can also be subject to further review by other individuals. The documents to be reviewed are created as a form of electronic content that is forwarded to others for review and revision, perhaps via an electronic network, or shared in real-time via a network.

These electronic documents typically contain digital content such as text, images, slides, and spreadsheets. During the creation of a document, content can be subject to revisions over a period of time, often by multiple people. Some document-editing applications—such as word processors, spreadsheet programs, and presentation applications—can allow users to add comments, suggestions, and/or add and delete content.

Authors and reviewers participating in this shared process typically make changes, such as additions, deletions, edits, comments, markups, or other modifications directly into the file containing the document. In such cases, the individuals involved in the collaborative process may be aware only at a high-level of the group of contributors who have added to the document, or they may only see who is the creator or manager, or most recent modifier, of this document. Furthermore, particularly in the cases of documents that have been subject to multiple revisions or that rely on the input of a larger group of authors, the ability to readily ascertain or track which author(s) or editor(s) were primarily responsible for the creation of the document can be challenging and at times obscured or unavailable. Thus, there remain significant areas for new and improved ideas for the efficient development of documents, as well as the assignment and management of authorship associated with its content.

SUMMARY

A data processing system, in accordance with a first aspect of this disclosure, includes at least one processor and one or more computer readable media. The computer readable media include instructions which, when executed by the at least one processor, cause the at least one processor to identify, at a first time, a first plurality of contributors to at least a portion of an electronic content item, the first plurality of contributors including a first contributor and a second contributor, and determine a first contribution metric for the first contributor and a second contribution metric for the second contributor. The instructions also cause the at least one processor to allocate, based at least on a comparison of the first contribution metric with the second contribution metric, a first score to the first contributor and a second score to the second contributor, the first score being higher than the second score. In addition, the instructions cause the at least one processor to cause to be displayed, to a first user accessing the electronic content item, a user interface including a first contributor listing identifying each contributor and a representation of their relative contribution to the electronic content item.

A method of presenting a contributor listing for electronic content, in accordance with a second aspect of this disclosure, includes identifying, at a first time, a first plurality of contributors to at least a portion of an electronic content item, the first plurality of contributors including a first contributor and a second contributor, as well as determining a first contribution metric for the first contributor and a second contribution metric for the second contributor. The method also includes allocating, based at least on a comparison of the first contribution metric with the second contribution metric, a first score to the first contributor and a second score to the second contributor, the first score being higher than the second score. Furthermore, the method includes causing to be displayed, to a first user accessing the electronic content item, a user interface including a first contributor listing identifying each contributor and a representation of their relative contribution to the electronic content item.

A method of presenting a contributor listing for electronic content, in accordance with a third aspect of this disclosure, includes causing to be displayed at a first time, to a first user accessing a first electronic content item, a first user interface. The first user interface includes a first listing identifying a first plurality of contributors to at least a portion of the first electronic content item, the first listing being presented in a first order, and a first selectable option for the first user to provide a first feedback regarding an accuracy of the first order. In addition, the method includes receiving a first user selection of the first selectable option confirming the accuracy of the first order, and automatically generating first training data based at least on the received first user selection. Furthermore, the method includes configuring a training model, based at least on the generated first training data, to determine a contribution score for each contributor of a second plurality of contributors who have contributed to a second electronic content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 5 is an implementation of an expanded view of the contributor listing portion of FIG. 4;

FIG. 6 is an implementation of an additional interface associated with the contributor listing portion;

DETAILED DESCRIPTION

Figure 1:
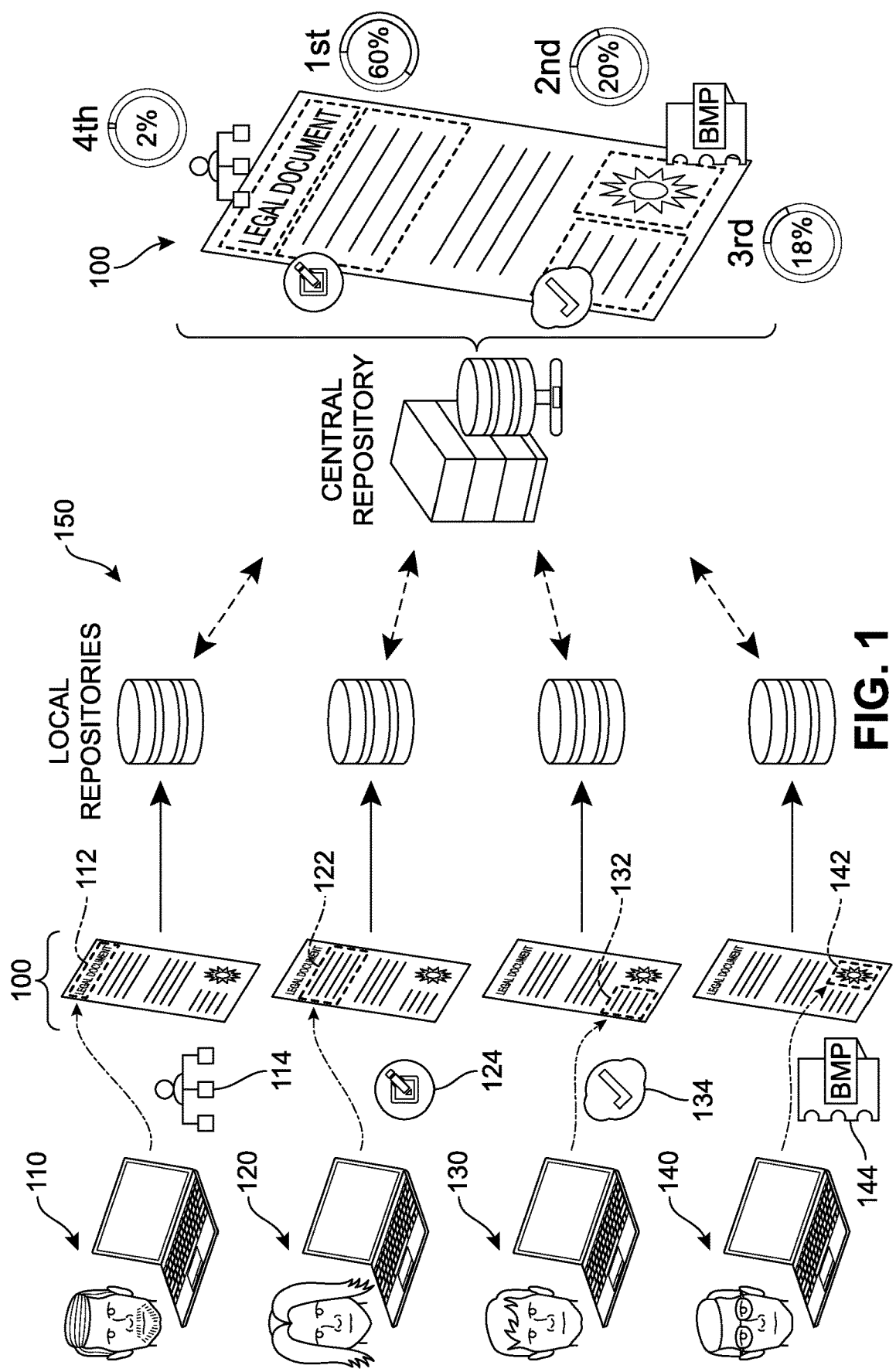
FIG. 1 illustrates an implementation of a document creation and review environment with a plurality of contributors.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following implementations introduce a contribution management system and process for facilitating the identification of individual users who have made contributions to an electronic content item or portions of an electronic content item. The identification and presentation of these contributors to those who access the electronic content item can provide a more realistic sense of which members of the collaboration group have invested the most (or more) time or overall effort to this document. In addition, such a tool can allow the collaborative group as a whole to remain cognizant of the proportion of work being done by individual members of the group and address imbalances or changes in roles. Furthermore, this system can offer users a broader awareness of the experience or expertise of different individuals by readily linking a person's contribution level to their specific content. As an example, a reader may review the list of contributors, in order of the degree or amount of their contribution and/or where each name includes a representation of the degree of contribution by the identified contributor, and then view other documents that have been developed by the identified contributor if so desired. These tools can provide collaborative document users and readers the ability to more clearly distinguish between casual contributors or non-contributing owners of the document from higher-level contributors whose authorship has helped to shape the content. In addition, the listing or identification of top contributors can be configured to facilitate communication between an interested reader and the identified contributor, which increases the ease with which members of larger organizations can collaborate, seek mentorship, or develop useful relationships.

As introduced above, applications such as word processors, publishers, spreadsheets, presentation software, and others can be used to generate electronic documents or content. In general, the term "electronic content" or "document" includes any digital data that may be presented (e.g., visually or audibly presented), including but not limited to an electronic document, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI, and other digital data. As an example, this electronic content may include spreadsheets, presentations, or other digital-based media.

Furthermore, within some types of documents, the electronic content can be understood to include elements that will be referred to as content portions. A "content portion" can be understood to include any part of electronic content that is defined or discernable as a part. For example, a content portion may be automatically discerned from a characteristic of the content portion itself (e.g., a letter, number, word, sentence, paragraph, section, image, symbol, or chapter of an electronic document, or other file format designation) or may be manually defined by a reviewer or end-user (e.g., selected collection of words in an electronic document, a selected portion of a digital image, a selected group of cells in a spreadsheet, a selected region in a slide from a presentation). Examples of content portions include portions or pieces of electronic text or other material within an electronic document, comments, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by reviewers within electronic content, including instances of scripted and non-scripted dynamic content and the like.

Furthermore, a contributor (or "user") can be understood to be a person who creates, authors, views, develops, manages, collaborates, suggests, guides, outlines, restructures, formats, modifies, reviews, brainstorms, revises, or deletes pieces of electronic content, including the creation, viewing, or updating of comments associated with the electronic content. A contributor includes a user of electronic content based application programs, as well as a user of the apparatus and systems described herein. Furthermore, for purpose of this description, the term "software application", "software", or "application" refers to a computer program that performs useful work, generally unrelated to the computer itself. Some non-limiting examples of software applications include word processors, spreadsheets, slideshows, presentation design applications, accounting systems, and telecommunication programs, as well as gaming software, utility and productivity tools, mobile applications, presentation graphics, and other productivity software.

In different implementations, software applications such as programs offered in the Microsoft Office Suite® (e.g., Word®, Powerpoint®, Excel®, Visio®), Office 365®, Microsoft 365®, and other suites or applications can offer a variety of commenting and annotating tools. For example, Microsoft Excel® offers users tools such as Comments, Highlight, Underline and other formatting options, Track Changes, Compare, among others, to add comments or make changes to a document. In other applications, such as Google Sheets® and Google Slides®, a "Comments" option may be used to suggest modifications or provide feedback for a document, or view comments. These are non-limiting examples, and any other electronic content editing or collaboration application may benefit from the disclosed implementations.

Once a change is made to a shared document, the document may present the changes in a substantially real-time manner to other users. Such 'instantaneous' or substantially real-time modifications and revisions can be used to facilitate collaborative workflows, as well as affect the degree of authorship that will be associated with each member of the collaborative group. It should be understood that electronic content (also referred to interchangeably as 'document(s)') being developed collaboratively include any activity in which multiple machines operate together autonomously, or as directed by humans, to process information, including electronic content. Processing the information may include the activities of acquiring the information, augmenting the information (e.g., via the addition of meta-data, such as comments), sorting the information, changing the information, deleting the information, rendering the information, aggregating the information from multiple sources, transforming the information from one form to another, and deriving new information from previously-existing information. One example of a collaborative process is the cooperation of multiple authors to draft content and reviewers to view, comment on, and make changes to a document as part of a shared review activity.

In scenarios where multiple contributors (e.g., authors and/or reviewers) are collaborating to produce a document, various parts of the document may be authored and/or revised at different times or during different stages of document development. For example, a first portion of the document may be finalized, a second portion of the same document may be in the midst of revisions, and a third portion within the same document may be in an initial drafting stage. Thus, document growth and development can vary across various portions of the document. Initially, a document may appear to be primarily the work or labor of only one or two authors. However, at a later time, many others may participate in the lifecycle of the document, and it may not be clear how much content was generated by a first contributor versus a second (or other) collaborator. In addition, a reader accessing a document may inadvertently assume that the document author is the individual listed as the "owner" or manager, and marginalize contributors who had in fact invested the greatest time, content, and/or ideas in the work. In some cases, readers may be required to track changes and comments to determine who added a content element or reviewed the document. These types of reviews are both time-consuming and can lead to inconsistent or inaccurate assessments of content authorship, reducing the efficiency of the development or completion of a document as well as diminishing (or inflating) the value of one person's contributions relative to another.

Furthermore, as a reader accesses a document, they may be slowed or perplexed in cases where there are large numbers of collaborators and the top contributors are not readily identifiable, particularly if the document is large or covers a range of information types. For example, a reader may wish to learn more about the ideas in a document, but not be able to identify the person primarily responsible for the content out of a larger group, and does not know who to contact. In some cases, the 'big picture' progress or workflow of a document or file may be obscured as the collaborators themselves attempt to communicate and discover that the person they believed was primarily responsible had simply initiated or created the document template, and then left the authorship to others. As will be described below, the proposed system provides both individual and group users the ability to more precisely communicate and appreciate electronic content authorship, providing readers and contributors with a more comprehensive and intuitive sense of the collaborative process. This in turn can improve the management of electronic documents and facilitate a more natural and effective workflow. These systems and methods can thereby facilitate an authentic collaborative atmosphere as well as provide streamlined and straightforward communication tools for connecting with the contributors.

Figure 9:
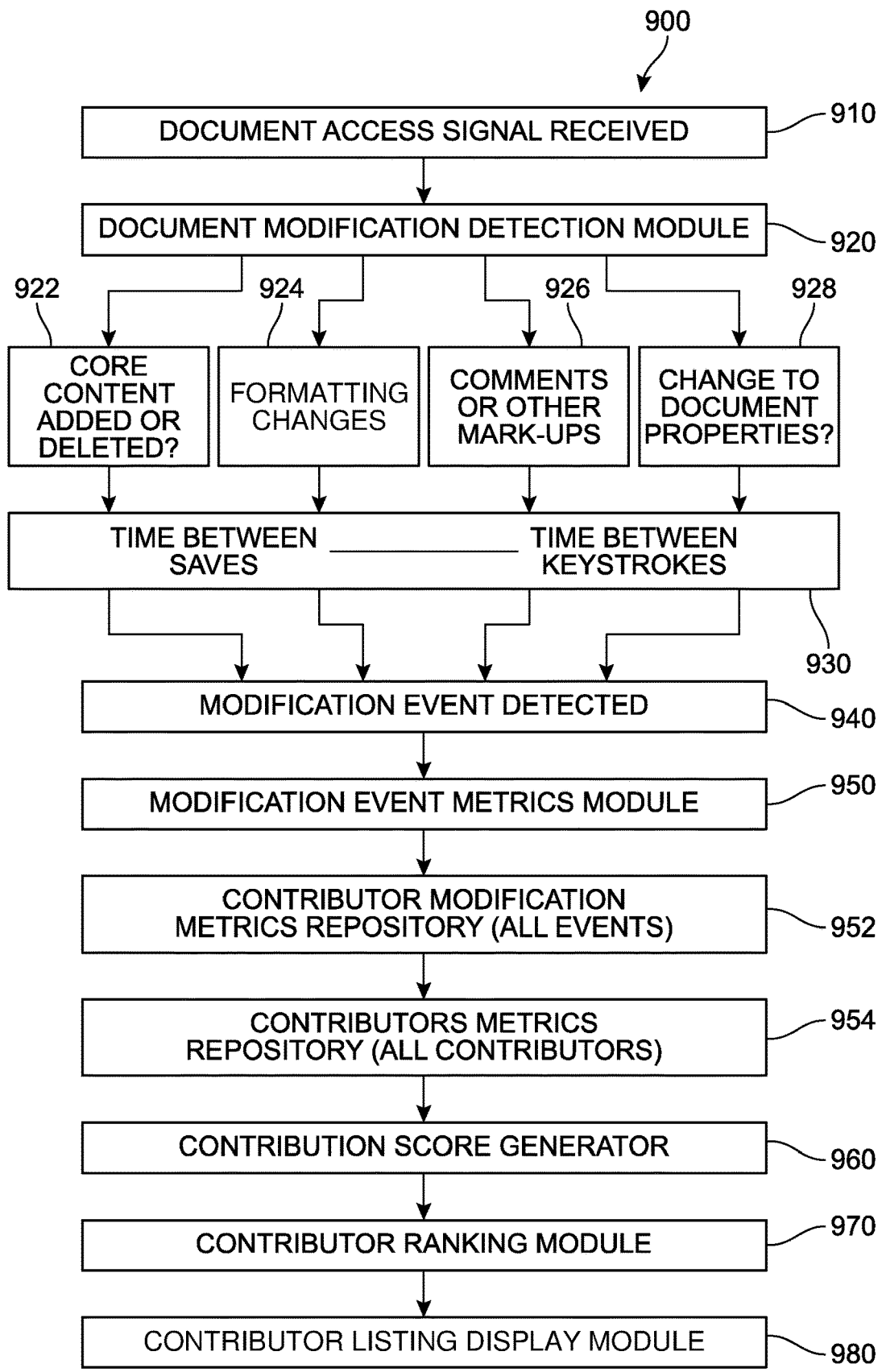
FIG. 9 is an implementation of a process of generating training data for a machine learning algorithm.

In order to better introduce the systems and methods to the reader, FIG. 1 presents an example of a representative collaborative document processing environment ("environment") 150 for implementing a content contribution management system (illustrated schematically in FIG. 9). In different implementations, the environment can include a plurality of computing device users, also referred to here as contributors or collaborators. For example, a first user 110, a second user 120, a third user 130, and a fourth user 140 are shown in FIG. 1. One or more users can interact with or manipulate data presented via a user device. In this case, each user is accessing a document 100 on separate computing devices that are linked via a network connected to the device's local data repositories. As the users collaborate on a shared document, various pieces or segments of the document may be modified or otherwise accessed at various times and across various devices. In one implementation, multiple users can access the same document at the same time and make changes that are presented in real-time or at a later time to other users. Thus, workflow occurs via multiple 'streams' that are configured to push data and pull data from the central repository or cloud network. The document 100, while illustrated here as a word processing file, can include any type of digital media file, as described above.

In this example, the first user 110 is a manager of the collaborative group and/or document 100, as symbolized by a hierarchical icon 114. The first user 110 may be linked to the document as an owner or the administrator for the document, and may have originally created the document, or suggested a template. For purposes of this example, the first user 110 is shown as having inserted a title header (a first portion 112) to one section of the document. At the same or some other time, the second user 120 can add or contribute a second portion 122 to the document 100, as symbolized by a drafting icon 124. In addition, the third user 130 is reviewing a third portion 132 of the document 100, as symbolized by a revision icon 134, and the fourth user 140 is inserting one or more graphics, images, or tables to the document 100 in a fourth portion 142, as symbolized by a graphics icon 144. As will be described in further detail below, in different implementations, one or more users can contribute or modify one or more content elements at any time during the lifecycle of the document generation, changing their respective degree or amount of authorship.

As the document 100 is created and modified by different contributors via a network or cloud-based collaborative application, there may be periodic or real-time updates to each person's content contribution ranking, which will be collectively made available as a contributor listing for a document. These contribution ranking updates can be a product of an assessment of several factors that have been determined to be associated with authorship or contribution to the document, as will be described below. In this example, the system has determined a share or proportion of contribution that each person has made (at or near the current time) to the document. In other words, as users continue to access and modify the document, the system will also continue to reassess and/or recalculate the estimated share or degree of contribution across the group of users. It should be understood that the number of collaborators can change (e.g., increase) over time which can also influence the resultant listing.

In FIG. 1, as an example, the system has determined, at this time, that the first user 110 has contributed approximately 2%, the second user 120 has contributed approximately 60%, the third user 130 has contributed approximately 20%, and the fourth user 140 has contributed approximately 18%. While these contribution amounts are represented by percentages in this example, it should be understood this is for purposes of simplicity only, and the score assigned or the type of metric used to represent an individual's contribution can vary and refer to any other system of measurement. By determining a degree of authorship for each user of the group the system can, based on that information, assign to each member of the group a score value corresponding to their contribution ranking.

It should also be understood that while the examples presented herein are primarily directed to contributor-ship to an entire document, the same systems and methods can be applied to smaller portions of a single document. In different implementations, one or more of a section, chapter, slide, page, graph, table, image, formatting, paragraph, sentence, word, footnotes, title, table of contents, or other selected portion or aspect of content in the document can be assigned one or more contributors with varying degrees of contribution. This can occur automatically, where a first user may view the contribution listing for portions of the document that had been created or revised by the first user, or can be presented to a user upon selection of one or more portions of the document by the user.

Thus, in this example, it can be seen that the second user 120 is in a first position ("1st"), or has contributed the most or to the greatest degree to the document 100 relative to the other users, the third user 130 is in a second position ("2nd"), having contributed less than the second user 120 but more than the fourth user 140. In addition, the fourth user 140 is in a third position ("3rd"), having contributed less than the third user 130 but more than the first user 110, and the first user 110 is in a fourth position ("4th"), having contributed the least or to the smallest degree to the document 100 relative to the other users. As will be discussed below, this information can be made available to those accessing the document, providing valuable guidance regarding the document collaboration structure and promoting awareness of the extent to which individual have contributed to the document. In other implementations, the contributors may be listed in any other order (e.g., alphabetical, random, date of last modification, etc.) while also including a presentation of their contribution score.

Figure 2:
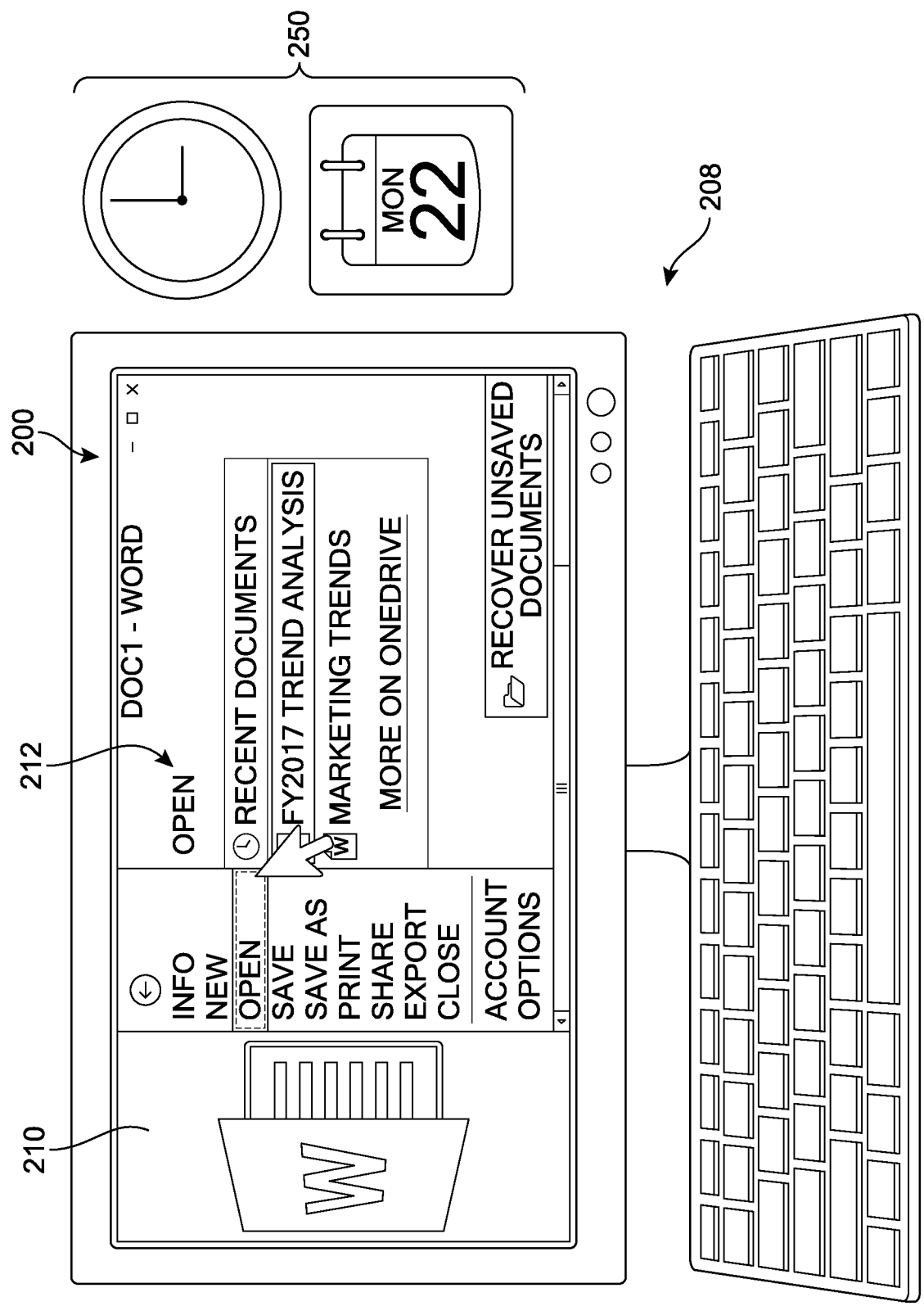
FIG. 2 is a computing display illustrating an implementation of a document processing application with a content interface presenting a plurality of options.

For purposes of clarity, an example of the contributor listing feature or mechanism is depicted in the sequence of FIGS. 2-5. Referring first to FIG. 2, an implementation of a display 200 for a computing device 208 is illustrated. In different implementations, the display 200 may present various icons, interfaces, graphics, applications, or other device status information. As an example, the display 200 includes a representation of the opening or accessing of a file associated with a first application 210 at a first time 250 (represented by a generic date calendar and clock). For purposes of simplicity, the first application 210 in FIG. 2 is a word processor program displaying an 'Open Document' interface 212, configured to facilitate the user's access of various documents or files. In one implementation, first application 210 may be understood to represent a version of Microsoft Word®, or another word processing program, such as Apple Pages®, Corel WordPerfect®, Google Docs®, IBM Lotus Word Pro® and other word editing programs. However, in other implementations, the first application 210 may include any other software applications within the Microsoft Office Suite® or array of Microsoft® products as well as any non-Microsoft® based applications.

In general, an "interface" can be understood to refer to a mechanism for communicating content through a client application to an application user. For example, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, which can trigger a change in the display of the application.

In addition, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. Thus, as non-limiting examples, an asset may include text in an actuatable pop-up window, audio associated with the interactive click of a button or other native application object, video associated with a teaching user interface, or other such information presentation.

Figure 3:
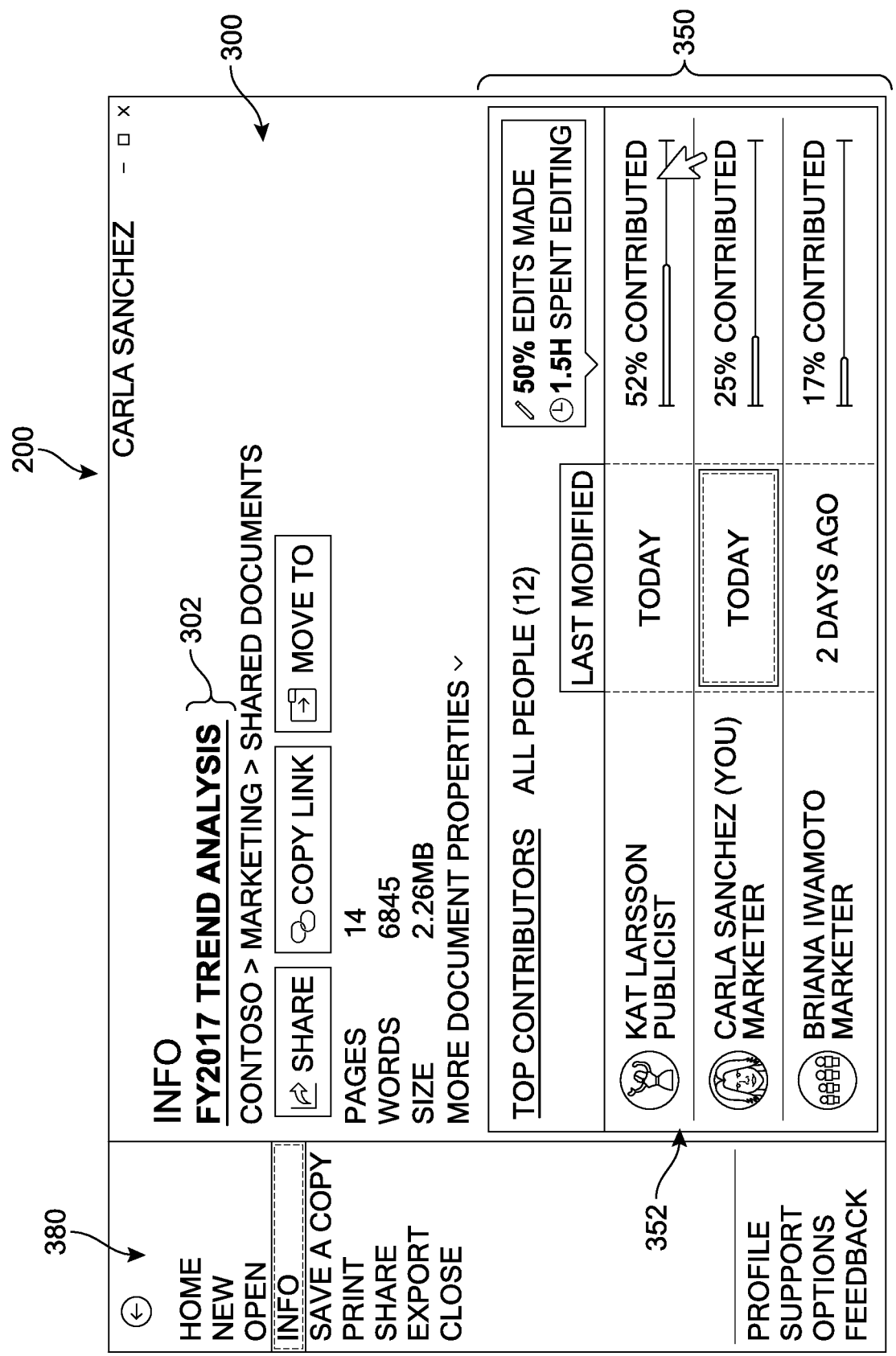
FIG. 3 is a display diagram illustrating an implementation of an information interface for a first electronic content item at a first time.

Once a user accesses an electronic content item, they may be able to view the document, information about the document, and/or options or tools that can be used in association with the document or application. Referring to FIG. 3, a simplified view of an implementation of the display 200 is presented in conjunction with the user access of a first electronic content item ("first content") 302, identified in this case by a file name "FY2017 Trends Analysis". The file name is presented within a first document properties interface ("first interface") 300 of the application that is included in the display window. In some implementations, the first interface 300 can be positioned or located adjacent or proximate to a second region, herein referred to as a main menu interface 380, or may extend outward from the main menu interface 380. The main menu interface 380 can be configured to display or present various options by which a user may navigate through the application and/or any stored or currently accessed documents. For example, in FIG. 3, a user may choose to print, save, share, close, etc. the application and/or currently accessed document.

As noted earlier, the system can include provisions for notifying or communicating to a user the various authors or contributors to the current document. In one implementation, these names can be shown in order of the individual's degree of contribution (i.e., contribution-based ranked order), or the names can be otherwise sorted but include an indication or representation of their respective contribution amount or score. In some implementations, the first interface 300 is configured to display or present a first contributor listing ("first listing") 350. While the actual details of the graphical user interface and the different options can vary widely, the first listing 350 can be generally understood as a presentation of names or other identifiers 352 for one or more of the user accounts that have been recorded as having engaged with, modified, or otherwise interacted with the current document, with some type of representation of the degree of their contribution relative to one another. For purposes of simplicity, the examples herein illustrate the listing in a ranked order of the proportion of their contribution (as estimated by the system), but it should be understood that this ranking is not necessary in order to convey to a reader the degree of contribution made by each contributor, as other depictions or representations can be used, including a pie chart, bar graph, percentage, fraction, color coding of each name, size or formatting of text for each name, or other display means that can indicate the relative contributions made by each identified contributor. FIG. 3 shows three contributors in the first listing 350.

In different implementations, in addition to an identifier for a user, the first listing 350 can include one or more of a user's profile details. As an example, a user profile refers to a source of information about the user that can include one or more of the user's name, contact information (e.g., email address(es), phone number(s), office location, address(es), chatroom ID), teleconference credentials, position within an organization, title, personal notes or messages a user may have added to their profile, status (e.g., whether the user is currently online or offline (or unavailable)), the last time the user was active online and/or active with respect to the current first content 302, the duration of time that this user has engaged with this content, the number of times this user has accessed this content, previous electronic content items the user has authored or collaborated on, projects or content that are currently being authored by this user, content items associated with this user that have not been viewed by the reader, the degree of contribution that has been attributed to this user by the system, contribution values that had been assigned to this user in previous versions of this document, and/or other user-specific data. This information can be harvested automatically from various repositories, and/or can have been inputted by the user themselves.

Figure 4:
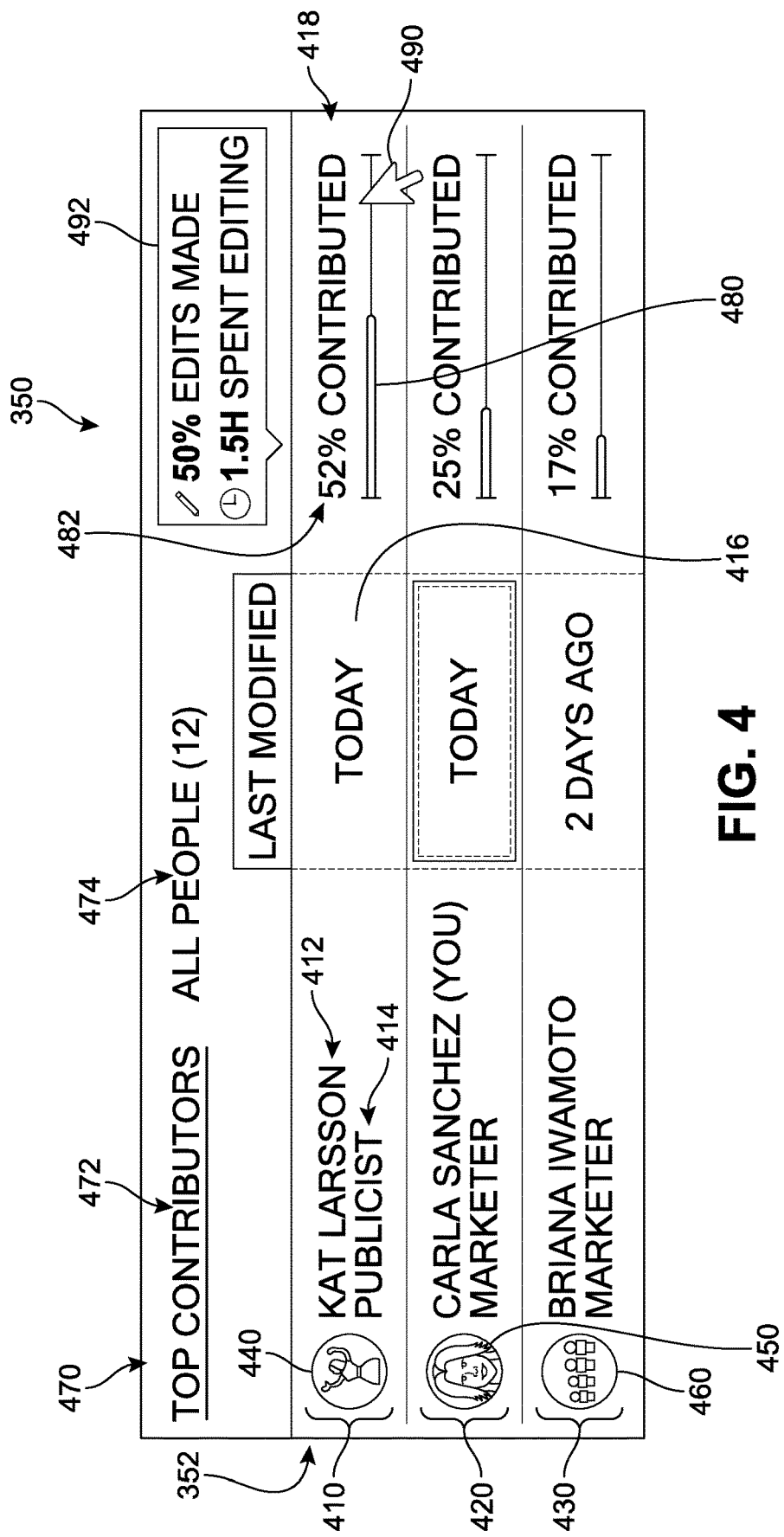
FIG. 4 is an isolated view of a contributor listing portion of the information interface of FIG. 3.

Additional details regarding the first listing 350 are provided with reference to FIG. 4, where an isolated view of the first listing 350 is presented for purposes of clarity. The first listing 350 can include a presentation of identifiers 352 that correspond to one of the contributors to the currently accessed content. As an example, the first listing 350 includes a first identifier 410 for a first contributor, a second identifier 420 for a second contributor, and a third identifier 430 for a third contributor. As noted earlier, each identifier can include information about the contributor. The first identifier 410 refers to a first contributor 440 (here represented by an image or other graphic), and can include a user name 412. The user name can be understood to be provided in most of the implementations of listings described herein. More optional are details such as a user title 414, a last modified indicator 416, and a contribution value indicator 418. The user name 412 (here "Kat Larsson") refers to the name of the contributor, the user title 414 (here "Marketer") refers to the role of this person, whether in an organization or their general profession, the last modified indicator 416 refers to the most recent time this user made any changes to this document, and the contribution value indicator 418 refers to some type of explicit or implicit representation of the amount of contribution this user has made to this document. In FIG. 4, the contribution value indicator 418 is a type of bar meter 480, where the meter is shown as being higher or lower based on the determined amount of contribution by this user relative to the amount of contribution made by all of the members of the group as a whole (in this case, a denominator or 'out of total' of 100 is used). In this example, the first contributor 440 has a contribution score 482 or value of 52%. However, in other implementations, any other representation can be used, including but not limited to a simple assignment of ranking (e.g., first place, second place, third place, etc.), a pie chart, a bar graph, a histogram, a score, or other illustration or numerical representation of degree of contribution, or such a representation may be omitted.

Each of the other listed contributors (a second contributor 450, a third contributor 460) also include similar data types. In different implementations, a contributor listing can provide a user with greater clarity or certainty regarding the context and structure of the collaboration, as well as enable the user to better assess who might be the most optimal contact in learning more about the material of the given document.

It can further be seen that the contributors are presented in the first listing 350 in order of their degree of contribution. In other words, the collaborators, having been ranked by the system, are also listed or presented in a manner that corresponds to the determined rank when viewed by a user. In this case, the list begins with the top-most contributor, with the next greatest contributor listed second, directly beneath or below the top-most contributor, and the third greatest contributor listed third, directly beneath or below the second contributor. Thus, the contributors are sorted in order of their degree of contribution.

In some implementations, additional information can be accessed by clicking, hovering, or otherwise issuing a command or instructions via the first interface 350. For example, as a mouse cursor 490 hovers over the contribution value indicator 480 for the first contributor 440, a new window or pop-up message 492 can be presented. The message 492 can include varying additional or alternate details regarding the data category or portion of the listing that has been selected. Because the contribution value indicator 480 was selected in this example, the message 492 presents additional information about the contribution value, such as but not limited a high-level identification of the type of work performed by the first contributor (e.g., "50% edits made"), how long they have been in first place, which task took them the longest time, as well an amount of time the first contributor 440 spent in this activity ("1.5 hours spent editing"). In other implementation different details can be presented.

While viewing the first listing 350, in some implementations, a user may be presented with a first header 470 that includes a first actuatable tab ("second tab") 472 and a second actuatable tab ("second tab") 474, where each tab can serve as a view or filter for the presented information. The first tab 472 ("Top contributors") is currently selected or displayed, while the second tab 474 ("All people (12)") may be dimmed or is otherwise less noticeable, and can signal the presence or availability of another aspect or view of the listing. In this case, because it has been determined that there are twelve contributors to the electronic content item, the tab refers to an opportunity to view information for all twelve of these individuals. The second tab 474 can thus signal the presence of other or additional information that is currently hidden or minimized or on a different page or section.

As noted above, in some implementations, the system can be configured to provide an option that permits a user to view additional or other contributors that are currently hidden or not immediately shown on the default or initial display. In FIG. 5, an example of an implementation of the listing is shown as it is expanded to include more or all of the contributors. The first listing 350 is increased in size, and eight contributors can be seen. In addition, a scroll-bar 510 is shown, representing a means of revealing the remaining four contributors. In other implementations, all of the contributors may be shown on the screen at once, or the region associated with the first listing 350 may remain substantially same in size, but the scroll-bar becomes available for a user to navigate to other names on the list, or the names are collapsed or decreased in size to fit the window. In another implementation, the listing may be shown in a new window to display all of the names.

This example also shows how movement of the cursor and/or hovering of the mouse 490 over a contribution value indicator 580 for the third contributor 460 has led to another (different) message 592 being presented that is associated with the work type and duration of time for the third contributor 460. It can further be seen that the ordering of the contributors remains as in FIG. 4, from the top of the list including the person who contributed the most toward the bottom of the list to the person who contributed the least.

In different implementations, during various user interactions with the first application, the system may include provisions for a user to easily access, explore, or learn more about a particular contributor or projects that a contributor has been associated with. In some implementations, this may be presented automatically, without any user selection. In other implementations, as shown in FIG. 6, the opportunity may be displayed or otherwise provided to the user in response to a triggering event, such as a mouse click, a shift using the cursor or arrow keys, a keyboard shortcut, a mouse-hover, a touch, or other input signal that is received by the system and corresponds to a request for additional information about a designated contributor. Referring to FIG. 6, a user has accessed the electronic content item that includes another implementation of the contributor listing (a second listing 650) that includes at least three contributors. In this example, a "Show More" type option 652 is available for a use to directly expand the contributor listing below the original list of three contributors, presented simply as an alternative to the tabbed layout shown in FIG. 4 and FIG. 5.

In FIG. 6, a triggering event has been registered by the system (see a cursor 690) that is associated with a fourth contributor 642 ("Briana Iwamoto"). In response to the triggering event, the first application generates and displays a new drop-down menu, herein referred to as a contributor profile menu 610, listing a plurality of options and/or profile recitations that may be in some way related to the fourth contributor 640. The contributor profile menu 610 includes a header section 620, a collaborations section 630, and a documents section 640.

Figure 7:
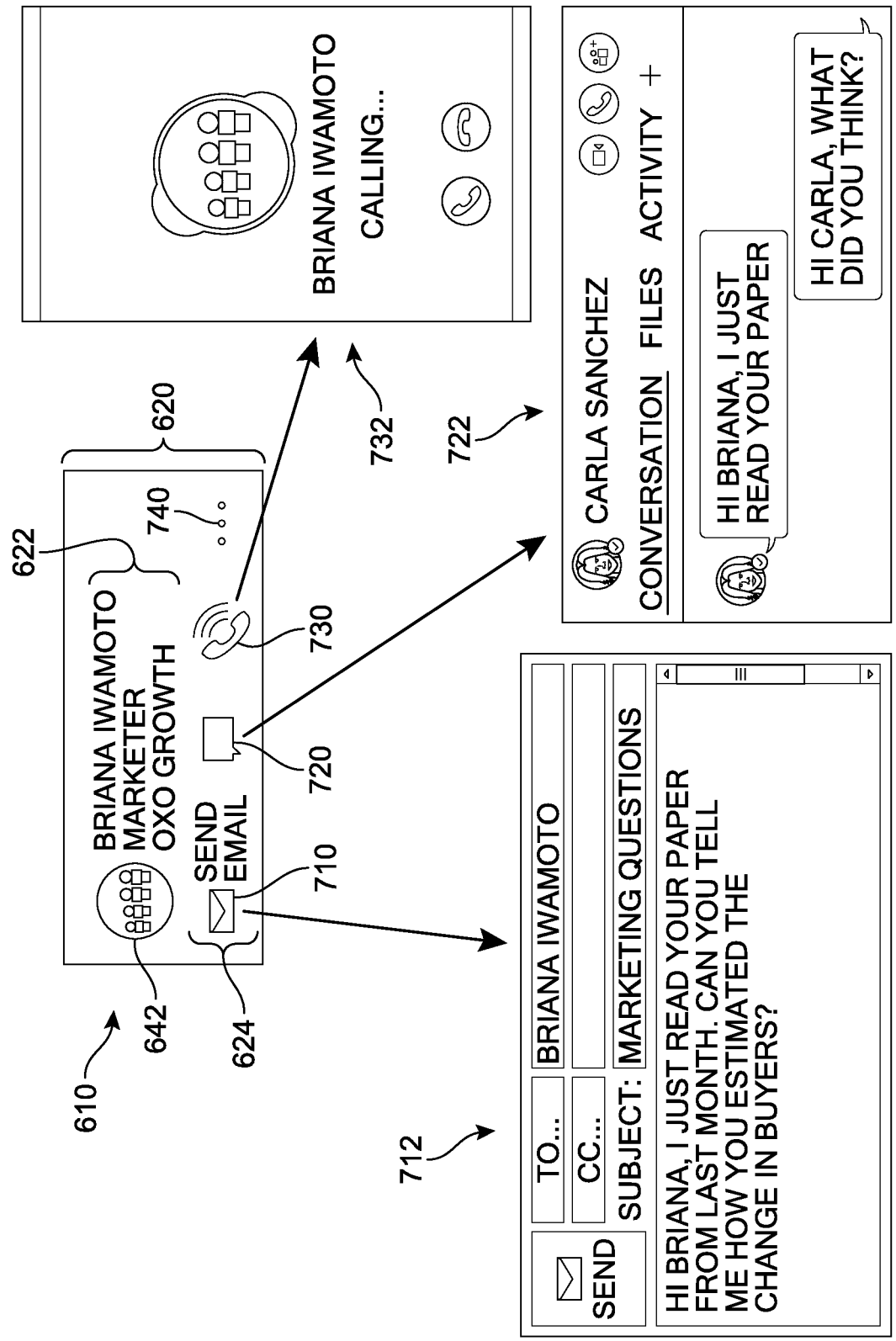
FIG. 7 is an isolated view of a contributor details indicator with some possible communication tools.

The header section 620 can include an overview 622 of the contributor, such as but not limited to the contributor's name, title, and organization, as well as a communication menu 624 (additional details will be provided with reference to FIG. 7). The collaborations section 630 can include a quick-view of other documents that the user has worked on with this contributor. The document section 640 can include another quick-view of other documents associated with this contributor that have not been accessed by the user. In some implementations, the quick-view items can function as links or selectable options which, when clicked or otherwise actuated, can initiate the opening or access of the particular document that has been selected. Additional sections may be revealed by scrolling down through the drop-down menu or window, and/or by minimizing the currently displayed sections.

It should be understood that these various sections (i.e., header section 620, collaborations section 630, and documents section 640) are presented for illustrative purposes only. Other implementations can include a wide range of additional or alternate information associated with the selected contributor, including but not limited to this contributor's (a) favorite documents, (b) frequently accessed documents, (c) documents that are similar to the one currently accessed, (d) most recently modified documents, (e) authored documents (all), (f) presentations, as well as (g) meetings that this contributor has attended (or any such upcoming meetings), (h) meetings where both the user and the contributor were in attendance (or any such upcoming meetings), (i) documents suggested by the contributor as related to or helpful in understanding this work, (j) documents cited by this contributor, (k) images of the contributor, (l) metrics about this contributor's collaborative efforts, (m) past communications with this contributor, (n) an organization chart or description providing more context for the current contributor's position or role, (o) access to the contributor's schedule (and/or ability to schedule an appointment with the contributor), (p) a resume or CV, and/or (q) the contributor's areas of expertise. As noted earlier, the term document in this case is to be understood in its broadest context, and can refer to any type of file containing electronic content, including online or shared content. It can be appreciated that the system can be further configured to allow contributors to hide certain portions of their profile or authored works, or specifically highlight or display other portions.

In different implementations, the system can include provisions for facilitating a connection, establishing a communication session, and/or fostering a relationship between a user and a contributor. Referring to FIG. 7, the communications menu 624 includes a first communication tool ("first tool") 710, a second communication tool ("second tool") 720, and a third communication tool ("third tool") 730, as well as an optional additional options or settings menu 740. The first tool 710, represented by an envelope icon ("Send email"), when selected and/or actuated by a user input, can respond to a triggering event by opening a new email window and/or cross-linking to an email application or other messaging service addressed to the contributor's email address, as reflected by a first communication mechanism 712. Similarly, the second tool 720, represented by a text box icon, when selected and/or actuated by a user input, can respond to the triggering event by opening an instant messaging or chat service between the user and the contributor, as reflected by a second communication mechanism 722. In addition, the third tool 730, represented by a telephone icon, when selected and/or actuated by a user input, can respond to the triggering event by opening a teleconferencing application or otherwise initiating a voice-based communication with the contributor, as reflected by a third communication mechanism 732. In some implementations, there may be additional indicators or options notifying the user as to the availability of the contributor, or their current location, or providing additional/alternate tools.

These options, presented in conjunction with the profile information of the contributor, can significantly promote, encourage, and/or foster authentic relationships between readers and authors and other colleagues, enhancing their ability to network and form genuine connections and mentorships. Furthermore, such simplified communications can truncate the process of 'following up' or further researching electronic content, asking questions, making suggestions, and/or generally obtaining any further information. Such a paradigm can rapidly increase and facilitate the professional exposure of individuals, permit them to make more useful contacts, and find other persons in their field of interest. Rather than limit themselves to networks where endorsements are made by a generalized, sweeping, high-level, or sometimes even inaccurate classification(s) of individuals, the ability to recognize collaborators directly by their work product can enhance their value and reputation in a more accurate and powerful way.

Figure 8:
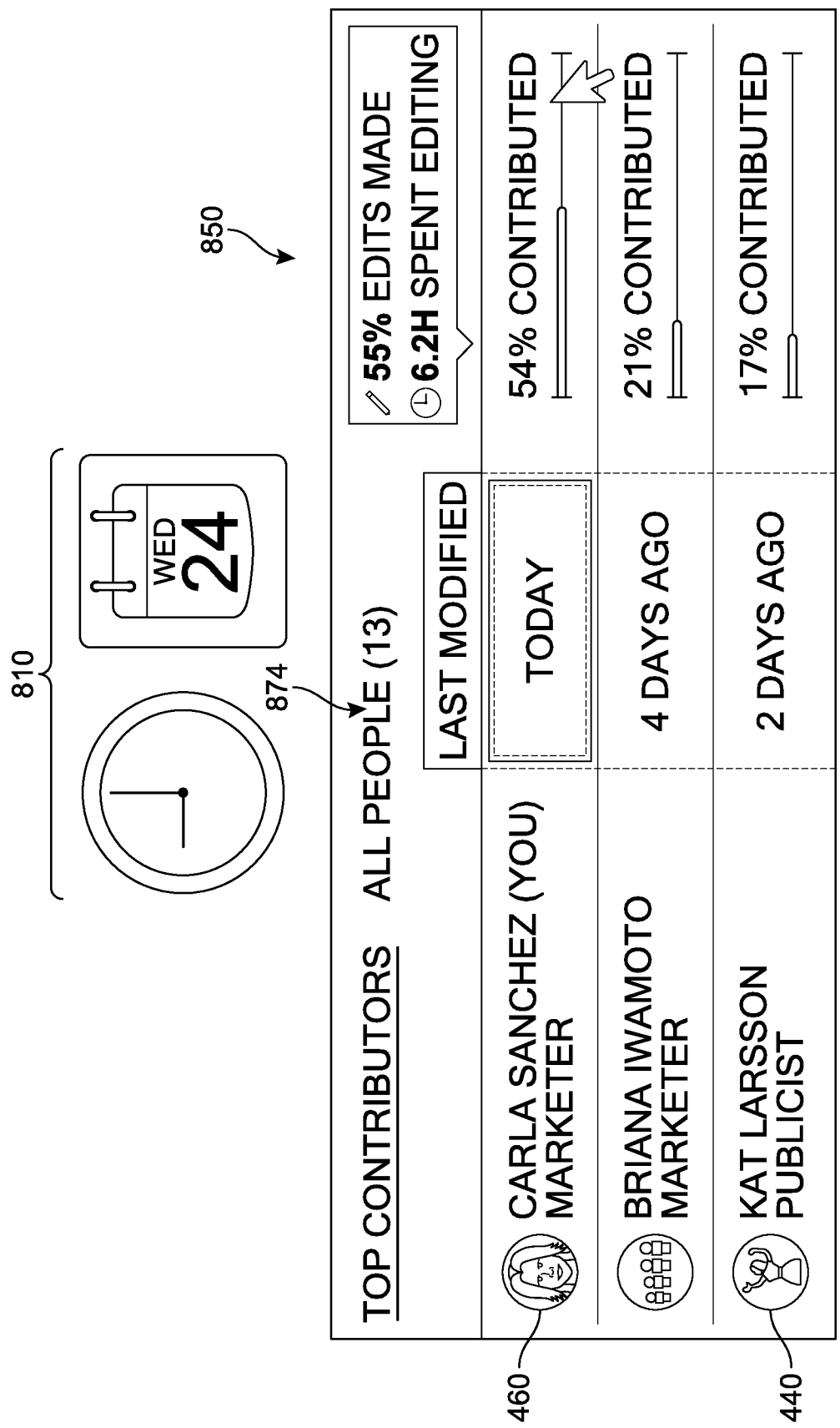
FIG. 8 is an implementation of another information interface for the first electronic content item at a time that is different than the first time with an updated contributor listing.

As described above, the listing of contributors and/or the contribution scores assigned to contributors for a particular document can change over time. In other words, collaborators may contribute differing amounts to the document at different points in time. In some implementations, the system can be configured to update the order and/or number of contributors associated with a document. One example is presented in FIG. 8, where a third listing 850 is depicted. The third listing 850 is an implementation of a contributor ranking at a second time 810 that is different from the first time 250 of FIG. 2. In this case, the second time 810 is at a time that is later or subsequent to the first time 250 (see FIG. 2).

The revised ranking shown in third listing 850 reveals that the third contributor 460 of FIG. 4 ("Carla Sanchez") has moved from third place or third contribution score to first place (having contributed the most relative to the others in the group as assessed at the second time). In contrast, the first contributor 440 ("Kat Larsson") has scored lower now, and has dropped from first place to third place. The metrics presented for each of the three contributors have also been revised to reflect the most recent activity of these users in the period of time extending between the first time and the second time. In addition, it may be appreciated that another person has joined the collaboration and made modifications to the document, as represented by the "All people (13)" tab header 874 (in contrast to FIG. 4).

As discussed above, in different implementations, various content modification events and telemetry can be registered by the system to help determine the order of the contributor listing. As this type of information is made available to the application, an intelligent assessment and estimate regarding contributor-ship can be made. In some implementations, the system can include provisions for determining which individual users are contributors, and estimating the extent of their contribution to a document. As one example, a process 900 of generating a contributor listing for a document is presented in FIG. 9.

In FIG. 9, a document modification detection module (DMDM) 920 can receive a series of messages or signals 910 that are configured to convey information relevant to the current status of an electronic content item, including its being accessed by a user, and/or which portions of the electronic content item are being edited or created. For example, one or more document modification indicators can be used to determine whether the currently accessed document is associated with a modification event 940. The term 'modification indicator' will refer generally to any condition or circumstance that may be associated with a substantial likelihood that a user's actions have resulted in a change or edit to the document.

For purposes of clarity, only four decision paths (aligned with four modification indicators) are depicted in the decision tree of FIG. 9. However, it should be understood that a variety of factors can be considered by the DMDM 920 to help determine whether the document is associated with a modification event(s). Furthermore, results based on values from two or more paths (e.g., a first path and a second path) may be combined to produce a determination of a larger modification (and therefore a greater contribution score).

In FIG. 9, a first path 922 evaluates whether any (additional) core content has been inputted or any previously inputted content deleted. The term 'core content' refers to data added to the body of the file, such as text, shapes, images, graphics, charts, footnotes, headers/footers, or any other substantive changes in content within the document itself. It should be understood that factors such as (a) the type of content added or deleted, (b) whether the change was the result of many or various keystrokes or a quick "Copy+Paste" and/or "Select+Delete", as well as (c) the time spent in making the addition or deletion, will also be recorded and considered when assessing the corresponding contribution value of the action. A second path 924 evaluates whether there have been any changes to the formatting or appearance, such as but not limited to page margins, orientation, size, columns, bullet points, line numbers, colors, fonts, effects, background, text moves, alignment, line and paragraph spacing, or other such changes. A third path 926 evaluates whether there have been any comments or revisions made to the document, and a fourth path 928 evaluates whether the document properties have been altered, including but not limited to file size (e.g., increase from 4 kb to 7 kb), file name, file path (location), file shares, file type, and any other file metadata.

Any of these indicators—or others—can establish that a document modification event has occurred, as represented by a modification event detected stage 940. With respect to each of these indicators, the time spent reviewing the document, the time over which the detected change occurs, as well as time between saves (e.g., file timestamps), and time interval between keystrokes or other input occurrences (see time step 930) may also be taken into account along with the details of the event itself and transmitted to a modification event metrics module 950. As an example, a short interval between keystrokes can suggest the continuation of an ongoing modification event, while a longer duration between keystrokes can suggest the occurrence of two different or distinct modification events that should be given separate weight. The data generated by the modification event metrics module 950 can represent a measure of the amount of the contributor's changes during this particular event.

In some implementations, each modification event received by the modification event metrics module 950 is associated with a respective time, such as, but not limited to, a timestamp indicating when an associated modification was detected (for example, by a client program or a server program), and the modification event metrics module 950 is configured to generate contributor metrics based on at least the times associated with the modification events. There are various approaches by which the modification event metrics module 950 may generate contributor metrics. In accordance with a first approach for generating contributor metrics, the modification event metrics module 950 is configured to discretize a period of time (such as a period of time during which a document is being modified) into bins each having a duration of approximately BIN_SIZE. In some examples, BIN_SIZE may be approximately 900, 1200, 1500, 1800, or 2100 seconds in duration, although other durations may be used. The modification event metrics module 950 is then further configured to, for each of one or more contributors to an electronic content, determine a number of bins in which the times associated with modification events for a contributor have occurred. A contributor metric may be generated based on the determined number of bins. For example, if one or more events are identified for a bin, the bin gets a value of 1, and otherwise the bin gets a value of 0, and the contributor metric is the number of bins with a value of 1. If a contributor metric has previously been generated and recorded for a contributor for an electronic content, such as from earlier modifications of the electronic content by the contributor, the recorded contributor metric may be increased based on the determined number of bins. With this first approach, once a first modification event is identified as being associated with a bin, a second modification event associated with the same bin will not further increase a contributor metric (assuming the first and second modification events are not weighted differently).

In accordance with a second approach for generating contributor metrics, the modification event metrics module 950 is configured to generate a metric for a contributor for an electronic content based on at least durations between successive modification events. In some examples, a duration KERNEL_SIZE may be used as a maximum duration used between successive modification events. In some examples, KERNEL_SIZE may be approximately 900, 1200, 1500, 1800, or 2100 seconds in duration, although other durations may be used. For example, a contributor metric contribution $z(u,d)$ for an ith modification event in a series of modification events 0 to n for an electronic content d, with associated times $t_i$, for a contributor c may be calculated according to:

$$z_i(u, d) = \begin{cases} \text{KERNEL\_SIZE}, & \text{if } t_i - t_{i-1} > \text{KERNEL\_SIZE} \\ t_i - t_{i-1}, & \text{otherwise} \end{cases}$$

In an example in which a weight $w_i$ is associated with each of the modification events, the above calculation may be modified as follows:

$$z_i(u, d) = \begin{cases} w_i \times \text{KERNEL\_SIZE}, & \text{if } t_i - t_{i-1} > \text{KERNEL\_SIZE} \\ w_i \times (t_i - t_{i-1}), & \text{otherwise} \end{cases}$$

A contributor metric, or a portion of a contributor metric, $Z_n(u,d)$ may then be generated according to:

$$Z_n(u, d) = \text{KERNEL\_SIZE} + \sum_{i=1}^{n} z_i(u, d)$$

The metric $Z_n(u,d)$ may be updated based on an additional modification event, n+1, as follows, to generate contributor metric, or a portion of a contributor metric, $Z_{n+1}(u,d)$:

$$Z_{n+1}(u,d) = Z_n(u,d) + z_{n+1}(u,d)$$

Advantages of the second approach over the first approach include reduced underestimation of contributions and more direct application of weights to individual modification events.

With both the first and second approaches, the durations BIN_SIZE and KERNEL_SIZE are optimizable parameters which may be automatically generated. For example, the techniques described in connection with FIG. 10 may be used to identify electronic content items for which metrics appear to have been scored correctly or incorrectly. Modification event data for each of these electronic content items may be stored and curated (which may include human selection of modification events) to build a pool of training data items. For each of these training data items, a "ground truth" metric may be calculated to a third approach. Using these ground truth metrics, optimization of BIN_SIZE or KERNEL_SIZE may be performed to minimize a total error across the training data set. For example, an error for a training data item may be the difference, or a square of the difference, between the ground truth metric and the metric generated using a particular value of BIN_SIZE or KERNEL_SIZE.

In addition, in some implementations, a greater or lesser weight can be coupled with or assigned to one or more indicators. This can allow the system to designate varying degrees of 'effort' or value to the different contribution indicators. As one example, creation of new textual content may be assigned a greater weight than a simple text font color change. In another example, the insertion of a new comment may be assigned a greater weight than the move of one paragraph from a first section of the document to another, second section of the document. In some cases, the incorporation of revisions following a first time period during which the contributor reads or reviews the document is assigned a greater weight than the addition of revisions following a shorter, second period of time during which the contributor quickly skims the document. Similarly, the inclusion of an outline at the initial creation of the document may be assigned a greater weight than a table of contents (similar to an outline) that is inputted near the end of the document creation when most of the work has been done. Furthermore, the initial creation of a shared file (e.g., by a manager) can have less weight assigned than the entry of subsequent comprehensive content. In another example, the design and addition of a graph or table can be assigned a greater weight than the input of raw data. All of these weights can be adjusted or tweaked as the system receives feedback and/or a machine learning model implements training data, as will be described below with respect to FIG. 10.

The modification event metrics module 950 can share or transmit its metrics to a contributor modification metrics repository 952, which can record or store the metrics for each modification event that has occurred during all access periods of this document by this particular contributor, and merge or incorporate these metrics into a broader statistic or parameter that represents this individual's overall contribution thus far. In a next step, this measurement can be transmitted to or shared with a contributors metrics repository 954, where the statistics for each of the entire group of contributors can be stored. Such a repository can permit the system to readily assess the value of each contributor's modification(s) relative to one another, which is of great importance to the generation of the ranked contributor listing.

Based at least on this information, the system can process and generate a score for each contributor via a contribution score generator 960 that places each contributor's contribution in context of the contributions that have been made as a whole with respect to this document. Each score of this plurality of scores will be sorted and ordered via a contributor ranking module 970 that assigns a level or position to each contributor based on their relative score (e.g., a contributor with a higher score will be ranked above a contributor with a lower score). Finally, this calculated ranking can be conveyed to a contributor listing display module 980 for presentation to users upon access of the document.

Thus, in different implementations, the system can be configured to register or detect any action a user performs in conjunction with document, review the action(s), determine its value, aggregate this value with other actions the user has performed with respect to this document, place these aggregated values in a larger context that includes all contributors to this document, assign a contribution score to each user, and rank them in a listing from top contributor to lesser contributors and present this listing in a user interface. These scores can be updated in real-time, updated after detection of any modification event, and/or updated periodically.

In different implementations, the system can include provisions for determining contributor scores and improving the accuracy of these scores. For example, the system can be configured with a machine learning algorithm (MLA) that receives and processes a wide variety of parameters that may be associated with a contributor modification event (see FIG. 9). In some implementations, the system can be configured with one or more training data generation and/or collection mechanisms to obtain training data for a variety of contexts, training a ML model, and/or applying the trained ML model. In some implementations, the training system can be configured to generate a trained ML model from application-generated training data obtained via user input. The generation of the ML model may be referred to as "training" or "learning." The training system may include and/or have access to substantial computation resources for training, such as a "cloud" including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, a size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced, while in others there may be multiple trained ML models. In different implementations, the disclosed systems and methods can use machine learning to identify top contributors based on parameters described herein (see for example FIG. 9). The data corresponding to these parameters can be used by the MLA to rank the users associated with a document based on their contribution.

Furthermore, in some implementations, some or all of the document modification detection module 920, the modification event metrics module 950, the contribution score generator 960, and/or the contributor ranking module 970 may be implemented using a distributed computational framework configured to perform real-time processing (for example, stream processing based on a continuous flow of document access signals and/or detected modification events), near-real-time processing (for example, stream processing based on document access signals and/or detected modification events), batch processing (for example, batch processing of document access signals and/or detected modification events performed periodically, such as every 24 hours or every hour), or combinations thereof (for example, using a lambda architecture). In an example implementing a lambda architecture, a batch job periodically recomputes a final result (for example, every 24 hours); in parallel, a real-time stream processor generates a more immediate, but possibly tentative, result to make available real-time or near-real-time updates in contribution scores and/or contributor rankings. For batch processing, a MapReduce or MapReduce-like equivalent programming model (for example, using Apache Hadoop) may be used to implement a portion of the distributed computational framework. A real-time or near-real-time processing may be implemented using, for example, Apache Storm, Apache Spark, or other stream processing technologies. In some examples, a real-time or near-real-time processing may include formatting document access signals and/or detected modification events into a form more suitable for a later batch processing.

Figure 10:
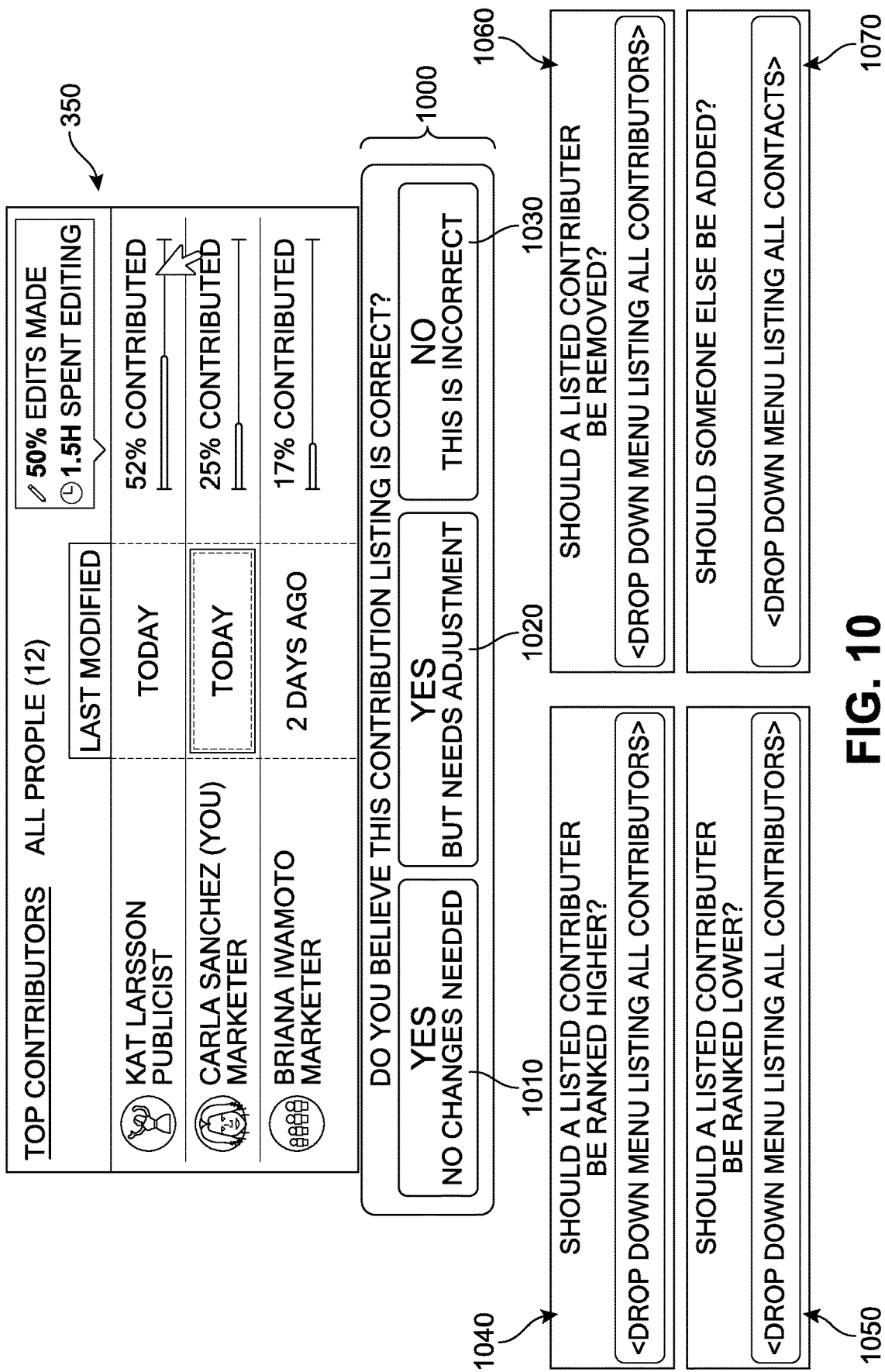
FIG. 10 is a flow diagram illustrating an implementation of a process for managing a listing of contributors to an electronic content item.

In FIG. 10, the first listing 350 is again shown. However, in this example, an additional feedback interface 1000 is also presented. While the feedback requested or received by the system can vary across different implementations, in general it is configured to solicit and obtain a user experience assessment regarding an accuracy of the presented listing. Thus, the feedback interface 1000 of FIG. 10 is shown only for purposes of clarity, and other implementations can vary widely. The feedback interface 1000 in this case asks "Do you believe this contribution listing is correct?" with a first response 1010 ("YES, no changes needed"), a second response 1020 ("YES, but needs adjustment"), and a third response 1030 ("NO, this is incorrect"). The selection of one of these options can denote a user's sense or belief in the accuracy (or inaccuracy) of the listing that is presented to them.

In addition, in some implementations, the system can further request that users provide details about how the listing should be corrected, for example by a first ranking editor 1040 ("Should a listed contributor be ranked higher?"), a second ranking editor 1050 ("Should a listed contributor be ranked lower?"), a third ranking editor 1060 ("Should a listed contributor be removed?"), and a fourth ranking editor 1070 ("Should someone else be added?"), where each option can be configured to permit the user to indicate more specifically which aspects of the listing are incorrect (for example, via a drop-down menu, or pop up window).

In different implementations, the responses provided by a user during their accessing of the contributor listing can shape or help train subsequent iterations of the model by which the lists are generated and serve as training data for future contributor listings. In other words, in some implementations, as the system is initially released or used, the ranking of the contributors, as well as the identification of which persons to include on the list, can be the product of an untrained or pre-training machine model that will be updated and trained based at least in part on this type of feedback. However, in other implementations, the model may be trained primarily via supervised learning.

Various ML algorithms and techniques for training ML models are discussed in U.S. Patent Application Publication Numbers 2013/0346346 (published on Dec. 26, 2013 and entitled "Semi-Supervised Random Decision Forests for Machine Learning"), 2014/0122381 (published on May 1, 2014 and entitled "Decision Tree Training in Machine Learning"), 2014/0172753 (published on Jun. 19, 2014 and entitled "Resource Allocation for Machine Learning"), 2015/0248764 (published on Sep. 3, 2015 and entitled "Depth Sensing Using an Infrared Camera"), 2015/0248765 (published on Sep. 3, 2015 and entitled "Depth Sensing Using an RGB Camera"), 2017/0132496 (published on May 11, 2017 and entitled "Hardware-Efficient Deep Convolutional Neural Networks"), 2017/0206431 (published on Jul. 20, 2017 and entitled "Object Detection and Classification in Images"), 2017/0236286 (published on Aug. 17, 2017 and entitled "Determining Depth from Structured Light Using Trained Classifiers"), U.S. patent application Ser. No. 15/870,783 (filed on Jan. 12, 2018 and entitled "Automated Collection of Machine Learning Data"), and 2017/0262768 (published on Sep. 14, 2017 and entitled "Depth from Time-of-Flight Using Machine Learning"), which are each incorporated by reference herein in their entireties.

Figure 11:
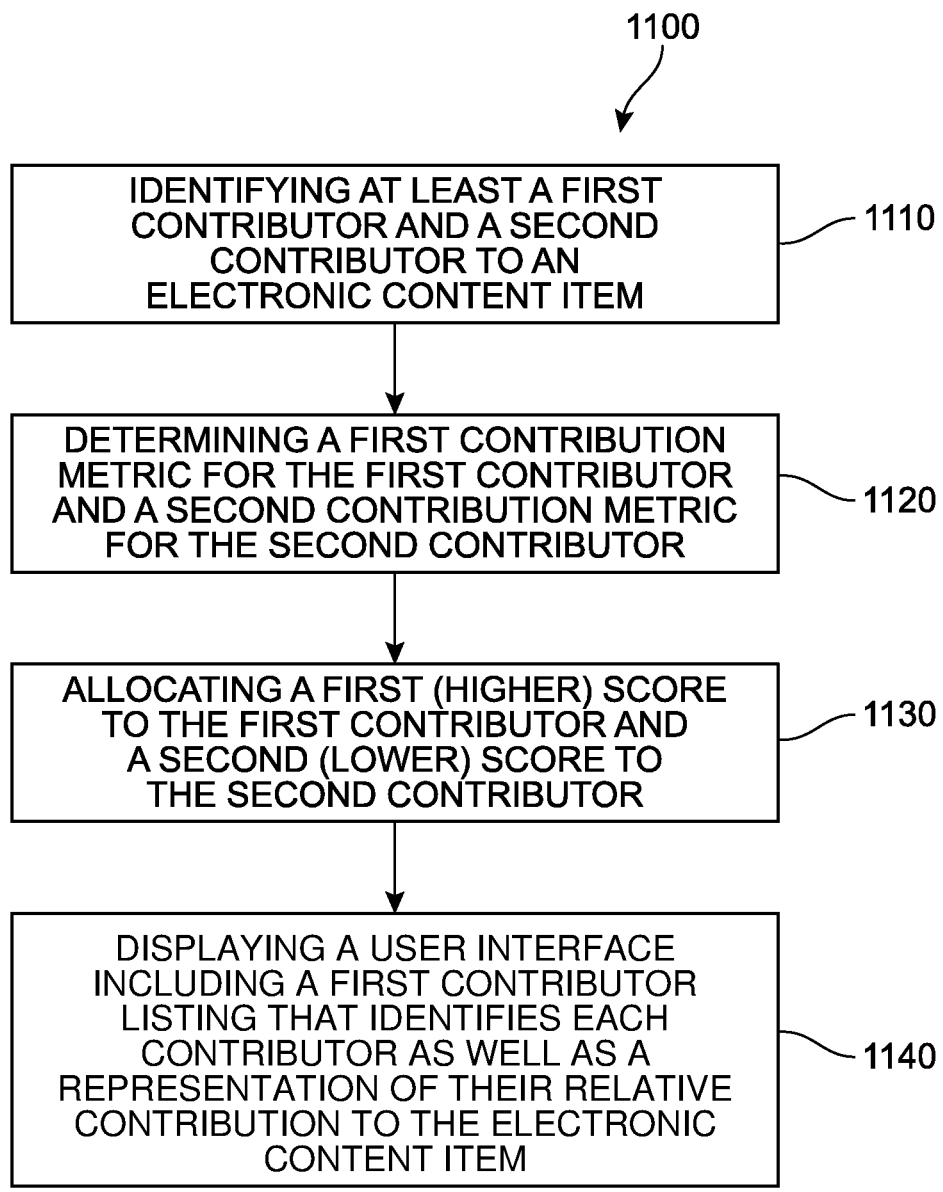
FIG. 11 is a flow diagram of an implementation of a method of determining a contribution score and presenting a list of contributors for an electronic content item.

FIG. 11 is a flow chart illustrating an implementation of a method 1100 of presenting a contributor listing for electronic content comprising. In a first step 1110 the method includes identifying, at a first time, a first plurality of contributors to an electronic content item (or a portion of that electronic content item). The first plurality of contributors can be understood to include at least a first contributor and a second contributor. The method also includes a second step 1120 of determining a first contribution metric for the first contributor and a second contribution metric for the second contributor. A third step 1130 involves allocating, based at least on a comparison of the first contribution metric with the second contribution metric, a first score to the first contributor and a second score to the second contributor, the first score being higher than the second score. In this case, the score is being 'allocated' in the sense that there is a denominator or total sum that represents the value of the entire contribution (by all contributors) that has led to the current state of the document, and the individual contributor score is a portion of that total score. A fourth step 1140 includes causing to be displayed, to a first user accessing the electronic content item, a user interface. The user interface includes a first contributor listing identifying the first contributor and the second contributor in a manner that reflects their relative contribution amounts to the electronic content. For example, the listing can be presented in order of the contributor's respective scores, and/or with a graphic or numerical indictor of their ranking or degree of contribution In other implementations, the method may include additional steps or aspects. As one example, the user interface can also include a first selectable option to view additional information related to the contributor listing. In some implementations, the method can also include receiving a first user selection of the first selectable option, and then automatically causing to be displayed, in response to receiving the first user selection, the additional information associated with the first contributor listing.

In different implementations, the additional information can include a first actuatable profile providing contact details for the first contributor, or an expanded view of the first contributor listing that displays all contributors of the first plurality of contributors in order of their relative scores. In another example, the method also includes receiving a second user selection of the first actuatable profile, and automatically causing to be displayed, in response to receiving the second user selection, a communication interface for contacting the first contributor. The communication interface can present actuatable options for establishing a communication session with the designated contributor. In some implementations, the method can also include receiving a second user selection of the first actuatable profile, and automatically initiating, in response to receiving the second user selection, a communications session with the first contributor (e.g., automatically establishing a connection between the designated contributor and the current user via a teleconferencing service, email, instant message, chatroom, texting, telephone, or other communication methods).

In other examples, the method includes receiving a second user selection of the first actuatable profile, and automatically causing to be displayed, in response to receiving the user actuation, one or more electronic content items to which the first contributor has contributed, for example in a list, recitation, or catalogue format. As another example, the method can include identifying, at a second time later than the first time, a second plurality of contributors to the electronic content item, the second plurality of contributors including at least the first plurality of contributors. The method further includes determining a third contribution metric for the first contributor and a fourth contribution metric for the second contributor, and then allocating, based at least on a comparison of the third contribution metric with the fourth contribution metric, a third score to the first contributor and a fourth score to the second contributor. In this example, the fourth score can be higher than the third score, though in other implementations, the third score can be higher than the fourth score (or tied). The method also includes causing to be displayed after the second time, to the first user accessing the electronic content item, an updated user interface including a second contributor listing in which the second contributor is listed above the first contributor. In one implementation, the updated user interface further comprises a panel indicating when each contributor of the second contributor listing last modified the electronic content item.

In some implementations, the method can include identifying, at a second time later than the first time, a second plurality of contributors to the electronic content item, the second plurality of contributors including the first contributor, the second contributor, and a third contributor. In other words, since the first time, additional people may have made contributions to the document. The method further includes determining a third contribution metric for the first contributor, a fourth contribution metric for the second contributor, and a fifth contribution metric for the third contributor, and then allocating, based at least on a comparison among the third contribution metric, the fourth contribution metric, and the fifth contribution metric, a third score to the first contributor, a fourth score to the second contributor, and a fifth score to the third contributor, the fifth score being higher than either of the third score and the fourth score. Furthermore, the method can involve causing to be displayed after the second time, to the first user accessing the electronic content item, an updated user interface including a second contributor listing in which the third contributor is listed above the first contributor and the second contributor. In one implementation, the updated user interface further comprises a panel indicating when each contributor of the second contributor listing last modified the electronic content item.

In addition, in some implementations, the method involves receiving a user actuation of the first actuatable profile, and automatically causing to be displayed, in response to receiving the user actuation, a listing of one or more electronic content items to which both the first contributor and the first user have contributed. In another example, the method includes receiving a user selection of the first actuatable profile, and automatically causing to be displayed, in response to receiving the user actuation, a listing of one or more electronic content items to which the first contributor has contributed that remain unopened by the first user. In one implementation, the first contribution metric is determined with reference to at least a total period of time during which the first contributor modified the electronic content item.

Other methods can also be contemplated within the scope of this disclosure. For example, a method of automatically generating machine learning training data can include a first step of causing to be displayed at a first time, to a first user accessing a first electronic content item, a first user interface. The first user interface can include a first listing identifying a first plurality of contributors to the first electronic content item, the first listing being presented in a first order, as well as a first selectable option for the first user to provide a first feedback regarding an accuracy of the first order. In addition, the method includes a second step of receiving a first user selection of the first selectable option confirming the accuracy of the first order, and a third step of automatically generating first training data based at least on the received first user selection. In a fourth step, the method includes configuring a training model, based at least on the generated first training data, to determine a contribution score for each contributor of a second plurality of contributors who have contributed to a second electronic content item.

In different implementations, this method can include additional or other steps. In one implementation, the method also includes causing to be displayed at a second time later than the first time, to a second user accessing the second electronic content item, a second user interface including a second listing identifying each contributor of the second plurality of contributors in a second order corresponding to their contribution score. In another implementation, the second user interface includes a second selectable option for the second user to provide a second feedback regarding an accuracy of the second order. Furthermore the method can involve receiving a second user selection of the second selectable option objecting to the accuracy of the second order, automatically generating second training data based at least on the received second user selection, and reconfiguring the training model, based at least on the generated second training data. In addition, in some implementations, the contribution score is determined with reference to at least a total amount of data added by a contributor to the electronic content item.

The detailed examples of systems, devices, and techniques described in connection with FIGS. 1-11 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-11 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 12:
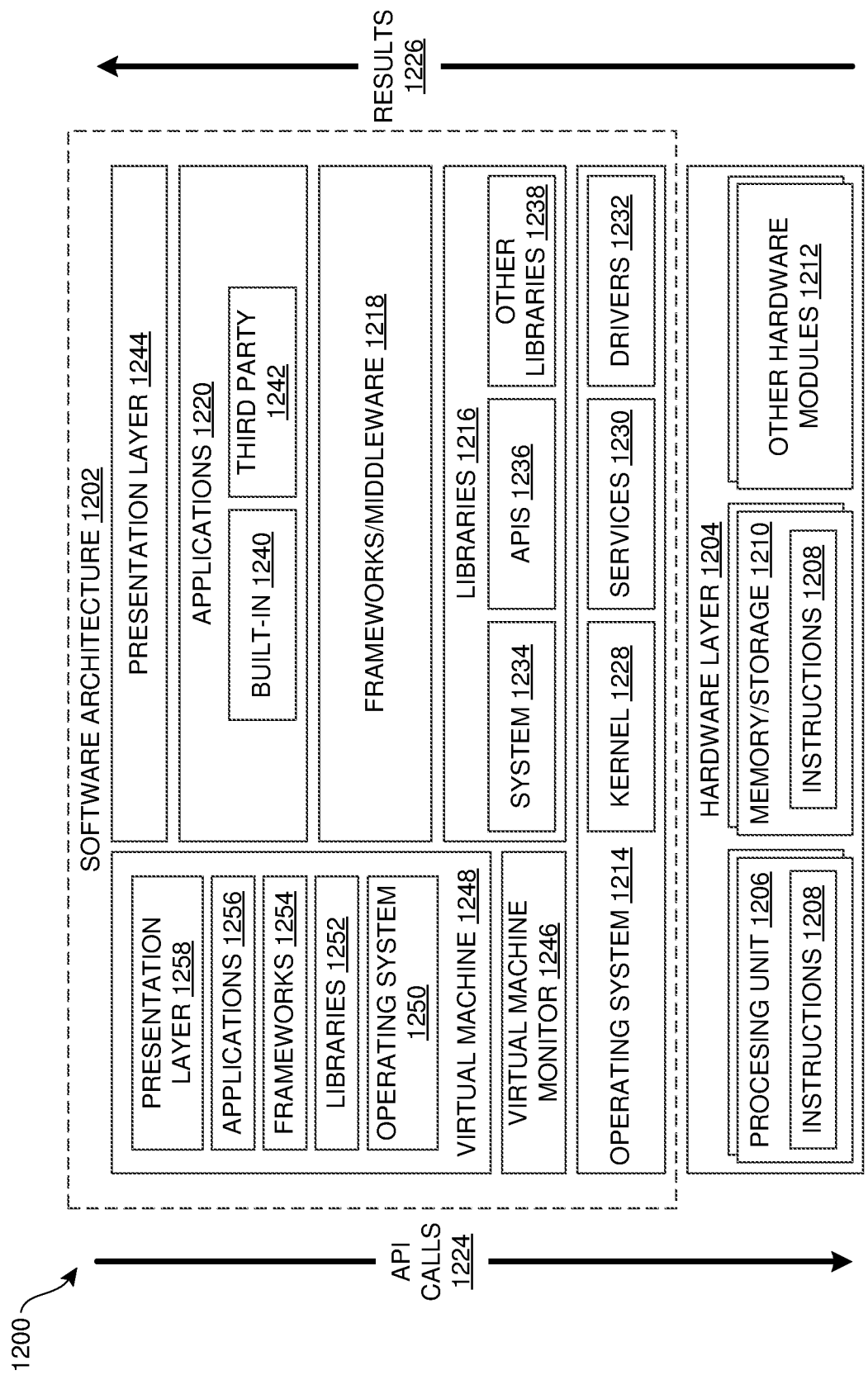
FIG. 12 is a block diagram of an example computing device, which may be used to provide implementations of the mechanisms described herein.

FIG. 12 is a block diagram 1200 illustrating an example software architecture 1202, various portions of which may be used in conjunction with various hardware architectures herein described, which may implement any of the above-described features. FIG. 12 is a non-limiting example of a software architecture and it will be appreciated that many other architectures may be implemented to facilitate the functionality described herein. The software architecture 1202 may execute on hardware that includes, among other things, document storage, processors, memory, and input/output (I/O) components. A representative hardware layer 1204 is illustrated and can represent, a computing device. The representative hardware layer 1204 includes a processing unit 1206 and associated executable instructions 1208. The executable instructions 1208 represent executable instructions of the software architecture 1202, including implementation of the methods, modules and so forth described herein. The hardware layer 1204 also includes a memory/storage 1210, which also includes the executable instructions 1208 and accompanying data. The hardware layer 1204 may also include other hardware modules 1212. Instructions 1208 held by processing unit 1208 may be portions of instructions 1208 held by the memory/storage 1210.

The example software architecture 1202 may be conceptualized as layers, each providing various functionality. For example, the software architecture 1202 may include layers and components such as an operating system (OS) 1214, libraries 1216, frameworks 1218, applications 1220, and a presentation layer 1244. Operationally, the applications 1220 and/or other components within the layers may invoke API calls 1224 to other layers and receive corresponding results 1226. The layers illustrated are representative in nature and other software architectures may include additional or different layers. For example, some mobile or special purpose operating systems may not provide the frameworks/middleware 1218.

The OS 1214 may manage hardware resources and provide common services. The OS 1214 may include, for example, a kernel 1228, services 1230, and drivers 1232. The kernel 1228 may act as an abstraction layer between the hardware layer 1204 and other software layers. For example, the kernel 1228 may be responsible for memory management, processor management (for example, scheduling), component management, networking, security settings, and so on. The services 1230 may provide other common services for the other software layers. The drivers 1232 may be responsible for controlling or interfacing with the underlying hardware layer 1204. For instance, the drivers 1232 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1216 may provide a common infrastructure that may be used by the applications 1220 and/or other components and/or layers. The libraries 1216 typically provide functionality for use by other software modules to perform tasks, rather than rather than interacting directly with the OS 1214. The libraries 1216 may include system libraries 1234 (for example, C standard library) that may provide functions such as memory allocation, string manipulation, file operations. In addition, the libraries 1216 may include API libraries 1236 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1216 may also include a wide variety of other libraries 1238 to provide many functions for applications 1220 and other software modules.

The frameworks 1218 (also sometimes referred to as middleware) provide a higher-level common infrastructure that may be used by the applications 1220 and/or other software modules. For example, the frameworks 1218 may provide various graphic user interface (GUI) functions, high-level resource management, or high-level location services.

The frameworks 1218 may provide a broad spectrum of other APIs for applications 1220 and/or other software modules.

The applications 1220 include built-in applications 1240 and/or third-party applications 1242. Examples of built-in applications 1240 may include, but are not limited to, a contacts application, a browser application, a location application, a media application, a messaging application, and/or a game application. Third-party applications 1242 may include any applications developed by an entity other than the vendor of the particular platform. The applications 1220 may use functions available via OS 1214, libraries 1216, frameworks 1218, and presentation layer 1244 to create user interfaces to interact with users.

Some software architectures use virtual machines, as illustrated by a virtual machine 1248. The virtual machine 1248 provides an execution environment where applications/modules can execute as if they were executing on a hardware machine (such as the machine 1000 of FIG. 10, for example). The virtual machine 1248 may be hosted by a host OS (for example, OS 1214) or hypervisor, and may have a virtual machine monitor 1246 which manages operation of the virtual machine 1248 and interoperation with the host operating system. A software architecture, which may be different from software architecture 1202 outside of the virtual machine, executes within the virtual machine 1248 such as an OS 1250, libraries 1252, frameworks 1254, applications 1256, and/or a presentation layer 1258.

Figure 13:
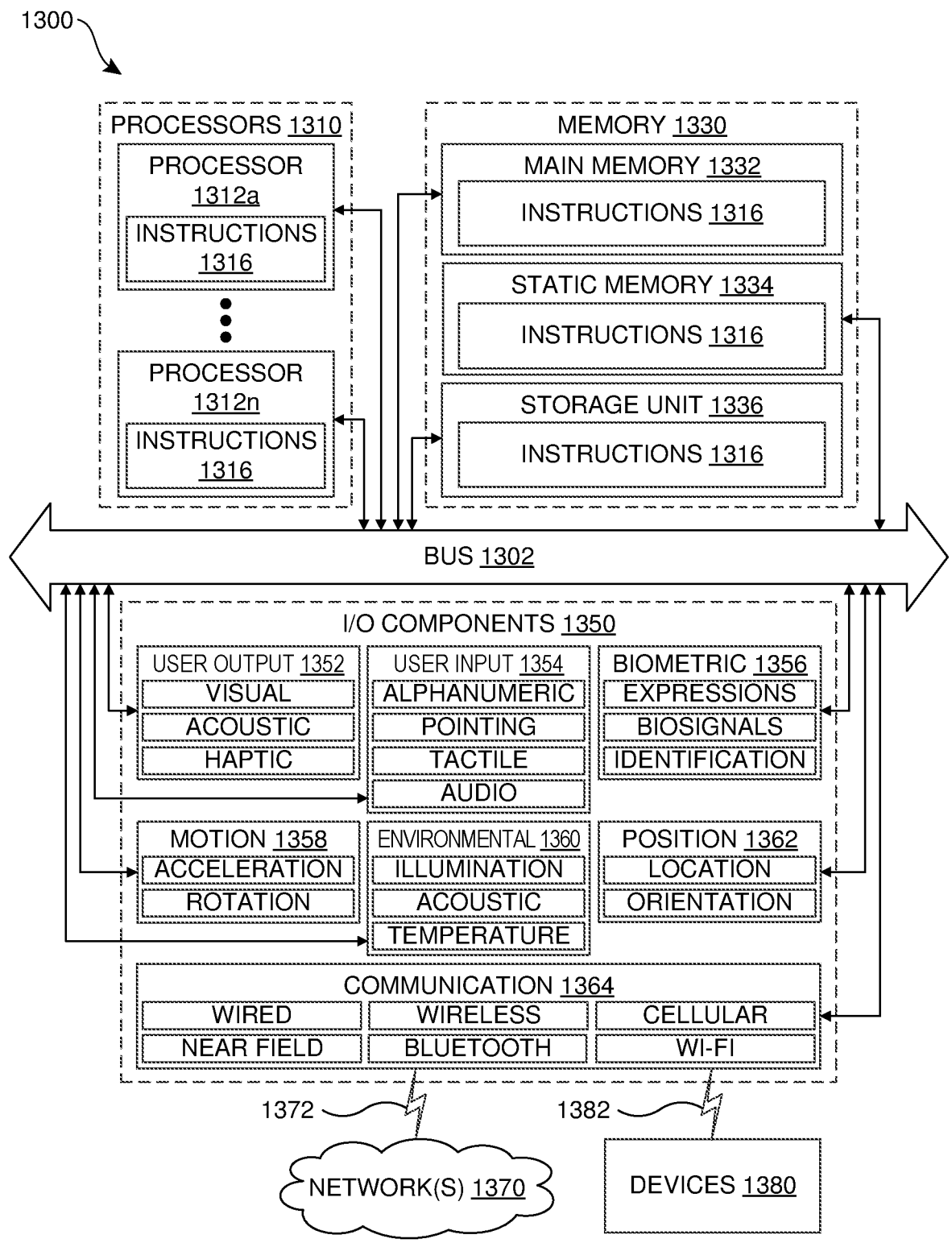
FIG. 13 is a block diagram illustrating components of an example machine configured to read instructions from a machine-readable medium.

FIG. 13 is a block diagram illustrating components of an example machine 1300 configured to read instructions from a machine-readable medium (for example, a machine-readable storage medium) and perform any of the features described herein. The example machine 1300 is in a form of a computer system, within which instructions 1316 (for example, in the form of software components) for causing the machine 1300 to perform any of the features described herein may be executed. As such, the instructions 1316 may be used to implement modules or components described herein. The instructions 1316 cause unprogrammed and/or unconfigured machine 1300 to operate as a particular machine configured to carry out the described features. The machine 1300 may be configured to operate as a standalone device or may be coupled (for example, networked) to other machines. In a networked deployment, the machine 1300 may operate in the capacity of a server machine or a client machine in a server-client network environment, or as a node in a peer-to-peer or distributed network environment. Machine 1300 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1300 is illustrated, the term "machine" includes a collection of machines that individually or jointly execute the instructions 1316.

The machine 1300 may include processors 1310, memory 1330, and I/O components 1350, which may be communicatively coupled via, for example, a bus 1302. The bus 1302 may include multiple buses coupling various elements of machine 1300 via various bus technologies and protocols. In an example, the processors 1310 (including, for example, a central processing unit (CPU), a graphics processing unit (GPU), a digital signal processor (DSP), an ASIC, or a suitable combination thereof) may include one or more processors 1312a to 1312n that may execute the instructions 1316 and process data. In some examples, one or more processors 1310 may execute instructions provided or identified by one or more other processors 1310. The term "processor" includes a multi-core processor including cores that may execute instructions contemporaneously. Although FIG. 13 shows multiple processors, the machine 1300 may include a single processor with a single core, a single processor with multiple cores (for example, a multi-core processor), multiple processors each with a single core, multiple processors each with multiple cores, or any combination thereof. In some examples, the machine 1300 may include multiple processors distributed among multiple machines.

The memory/storage 1330 may include a main memory 1332, a static memory 1334, or other memory, and a storage unit 1336, both accessible to the processors 1310 such as via the bus 1302. The storage unit 1336 and memory 1332, 1334 store instructions 1316 embodying any one or more of the functions described herein. The memory/storage 1330 may also store temporary, intermediate, and/or long-term data for processors 1310. The instructions 1316 may also reside, completely or partially, within the memory 1332, 1334, within the storage unit 1336, within at least one of the processors 1310 (for example, within a command buffer or cache memory), within memory at least one of I/O components 1350, or any suitable combination thereof, during execution thereof. Accordingly, the memory 1332, 1334, the storage unit 1336, memory in processors 1310, and memory in I/O components 1350 are examples of machine-readable media.

As used herein, "machine-readable medium" refers to a device able to temporarily or permanently store instructions and data that cause machine 1300 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1316) for execution by a machine 1300 such that the instructions, when executed by one or more processors 1310 of the machine 1300, cause the machine 1300 to perform and one or more of the features described herein. Accordingly, a "machine-readable medium" may refer to a single storage device, as well as "cloud-based" storage systems or storage networks that include multiple storage apparatus or devices.

The I/O components 1350 may include a wide variety of hardware components adapted to receive input, provide output, produce output, transmit information, exchange information, capture measurements, and so on. The specific I/O components 1350 included in a particular machine will depend on the type and/or function of the machine. For example, mobile devices such as mobile phones may include a touch input device, whereas a headless server or IoT device may not include such a touch input device. The particular examples of I/O components illustrated in FIG. 13 are in no way limiting, and other types of components may be included in machine 1300. The grouping of I/O components 1350 are merely for simplifying this discussion, and the grouping is in no way limiting. In various examples, the I/O components 1350 may include user output components 1352 and user input components 1354. User output components 1352 may include, for example, display components for displaying information (for example, a liquid crystal display (LCD) or a projector), acoustic components (for example, speakers), haptic components (for example, a vibratory motor or force-feedback device), and/or other signal generators. User input components 1354 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1350 may include biometric components 1356 and/or position components 1362, among a wide array of other environmental sensor components. The biometric components 1356 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1362 may include, for example, location sensors (for example, a Global Position System (GPS) receiver), altitude sensors (for example, an air pressure sensor from which altitude may be derived), and/or orientation sensors (for example, magnetometers).

The I/O components 1350 may include communication components 1364, implementing a wide variety of technologies operable to couple the machine 1300 to network(s) 1370 and/or device(s) 1380 via respective communicative couplings 1372 and 1382. The communication components 1364 may include one or more network interface components or other suitable devices to interface with the network(s) 1370. The communication components 1364 may include, for example, components adapted to provide wired communication, wireless communication, cellular communication, Near Field Communication (NFC), Bluetooth communication, Wi-Fi, and/or communication via other modalities. The device(s) 1380 may include other machines or various peripheral devices (for example, coupled via USB).

In some examples, the communication components 1364 may detect identifiers or include components adapted to detect identifiers. For example, the communication components 1364 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1362, such as, but not limited to, geo-location via Internet Protocol (IP) address, location via Wi-Fi, cellular, NFC, Bluetooth, or other wireless station identification and/or signal triangulation.

Furthermore, implementations of the present disclosure can make use of any of the features, systems, components, devices, and methods described in U.S. Patent Publication Number 2018/0115603 to Hu et al., published Apr. 26, 2018 and titled "Collaborator recommendation using collaboration graphs,"; and U.S. Patent Publication Number 2016/0314122 to Platakis et al., published Oct. 27, 2016 and titled "Identifying experts and areas of expertise in an organization," the disclosures of each of which are herein incorporated by reference in their entirety.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A data processing system comprising:
   at least one processor; and
   one or more computer readable media including instructions which, when executed by the at least one processor, cause the at least one processor to:
   identify, a first plurality of contributors to at least a portion of an electronic document, the first plurality of contributors including a first contributor and a second contributor;
   determine a first contribution metric for the first contributor and a second contribution metric for the second contributor, wherein:
   the first contribution metric for the first contributor indicates how much of the electronic document was generated by the first contributor, how long the first contributor spent modifying the electronic document, and a type of each modification made by the first contributor,
   the second contribution metric for the second contributor indicates how much of the electronic document was generated by the second contributor, how long the second contributor spent modifying the electronic document, and a type of each modification made by the second contributor, the type of each modification made by the first contributor and the second contributor is determined at least in part by a machine learning model configured to determine the type of a respective modification made by a respective contributor to the electronic document, and each type of modification is associated with a weight determined by the machine learning model, the weight indicative of a contribution value associated with each respective type of modification;

allocate, based at least on a comparison of the first contribution metric with the second contribution metric, a first score to the first contributor and a second score to the second contributor, the first score being higher than the second score; and cause to be displayed, to a first user accessing the electronic document, a user interface including a first contributor listing identifying each contributor and a representation of their relative contribution to the electronic document.

2. The system of claim 1, wherein the first contributor listing presents the first contributor and the second contributor in order of their respective scores.

3. The system of claim 1, wherein the user interface further includes a first selectable option for the first user to view additional information associated with the first contributor listing, and wherein the instructions further cause the at least one processor to:

receive a first user selection of the first selectable option; and automatically cause to be displayed, in response to receiving the first user selection, the additional information associated with the first contributor listing, wherein the additional information comprises at least one of an amount of work performed, a duration of contribution, an identification of which task took a longest time, and a duration of contribution to the task with a longest time.

4. The system of claim 3, wherein the additional information comprises a first actuatable profile, and wherein the instructions further cause the at least one processor to:

receive a second user selection of the first actuatable profile; and automatically cause to be displayed, in response to receiving the second user selection, a communication interface for contacting the first contributor.

5. The system of claim 3, wherein the additional information comprises a first actuatable profile, and wherein the instructions further cause the at least one processor to:

receive a second user selection of the first actuatable profile; and automatically cause to be displayed, in response to receiving a user actuation, one or more electronic documents to which the first contributor has contributed.

6. The system of claim 1, wherein the first contribution metric is determined by reference to at least one of a total modification duration, a number of modification events, and a total amount of data added.

7. A method of presenting a contributor listing for electronic content comprising:

identifying, at a first time, a first plurality of contributors to at least a portion of an electronic document, the first plurality of contributors including a first contributor and a second contributor;

determining a first contribution metric for the first contributor and a second contribution metric for the second contributor, wherein:

the first contribution metric for the first contributor indicates how much of the electronic document was generated by the first contributor, how long the first contributor spent modifying the electronic document, and a type of each modification made by the first contributor, the second contribution metric for the second contributor indicates how much of the electronic document was generated by the second contributor, how long the second contributor spent modifying the electronic document, and a type of each modification made by the second contributor, the type of each modification made by the first contributor and the second contributor being determined at least in part by a machine learning model configured to determine the type of a respective modification made by a respective contributor to the electronic document, and each type of modification is associated with a weight determined by the machine learning model, the weight indicative of a contribution value associated with each respective type of modification;

allocating, based at least on a comparison of the first contribution metric with the second contribution metric, a first score to the first contributor and a second score to the second contributor, the first score being higher than the second score; and causing to be displayed, to a first user accessing the electronic document, a user interface including a first contributor listing identifying each contributor and a representation of their relative contribution to the electronic document.

8. The method of claim 7, wherein the first contributor listing presents the first contributor and the second contributor in order of their respective scores.

9. The method of claim 7, wherein the user interface also includes a first selectable option for the first user to view additional information associated with the first contributor listing, and wherein the method further comprises:

receiving a first user selection of the first selectable option; and automatically causing to be displayed, in response to receiving the first user selection, the additional information associated with the first contributor listing, wherein the additional information comprises at least one of an amount of work performed, a duration of contribution, an identification of which task took a longest time, and a duration of contribution to the task with a longest time.

10. The method of claim 9, wherein the additional information comprises an expanded view of the first contributor listing that displays all contributors of the first plurality of contributors in order of their relative scores.

11. The method of claim 9, wherein the additional information comprises a first actuatable profile for the first contributor, and the method further comprises:

receiving a second user selection of the first actuatable profile; and automatically causing to be displayed, in response to receiving the second user selection, a communication interface for contacting the first contributor.

12. The method of claim 9, wherein the additional information comprises a first actuatable profile for the first contributor, and the method further comprises:

receiving a second user selection of the first actuatable profile; and automatically initiating, in response to receiving the second user selection, a communications session with the first contributor.

13. The method of claim 9, wherein the additional information comprises a first actuatable profile for the first contributor, and the method further comprises:

receiving a second user selection of the first actuatable profile; and automatically causing to be displayed, in response to receiving a user actuation, one or more electronic documents to which the first contributor has contributed.

14. The method of claim 8, further comprising:

identifying, at a second time later than the first time, a second plurality of contributors to the electronic document, the second plurality of contributors including at least the first plurality of contributors;

determining a third contribution metric for the first contributor and a fourth contribution metric for the second contributor;

allocating, based at least on a comparison of the third contribution metric with the fourth contribution metric, a third score to the first contributor and a fourth score to the second contributor, the fourth score being higher than the third score; and causing to be displayed after the second time, to the first user accessing the electronic document, an updated user interface including a second contributor listing in which the second contributor is listed above the first contributor.

15. The method of claim 8, further comprising:

identifying, at a second time later than the first time, a second plurality of contributors to the electronic document, the second plurality of contributors including the first contributor, the second contributor, and a third contributor;

determining a third contribution metric for the first contributor, a fourth contribution metric for the second contributor, and a fifth contribution metric for the third contributor;

allocating, based at least on a comparison among the third contribution metric, the fourth contribution metric, and the fifth contribution metric, a third score to the first contributor, a fourth score to the second contributor, and a fifth score to the third contributor, the fifth score being higher than either of the third score and the fourth score; and causing to be displayed after the second time, to the first user accessing the electronic document, an updated user interface including a second contributor listing in which the third contributor is listed above the first contributor and the second contributor.

16. The method of claim 15, wherein the updated user interface further comprises a panel indicating when each contributor of the second contributor listing last modified the electronic document.

17. The method of claim 7, wherein the first contribution metric is determined with reference to at least a total period of time during which the first contributor modified the electronic document.

* * * * *